(12) United States Patent
Zhang et al.

(10) Patent No.: US 11,894,509 B2
(45) Date of Patent: Feb. 6, 2024

(54) WINDING DEVICE AND WINDING APPARATUS

(71) Applicant: CONTEMPORARY AMPEREX TECHNOLOGY CO., LIMITED, Ningde (CN)

(72) Inventors: Wei Zhang, Ningde (CN); Xiaowei Zhang, Ningde (CN); Xiang Wu, Ningde (CN); Yuqian Wen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/215,808

(22) Filed: Jun. 28, 2023

(65) Prior Publication Data
US 2023/0343987 A1 Oct. 26, 2023

Related U.S. Application Data

(63) Continuation of application No. PCT/CN2022/072826, filed on Jan. 19, 2022.

(51) Int. Cl.
*H01M 10/04* (2006.01)
*H01M 10/0587* (2010.01)

(52) U.S. Cl.
CPC ... *H01M 10/0409* (2013.01); *H01M 10/0587* (2013.01); *B65H 2405/461* (2013.01)

(58) Field of Classification Search
CPC .............. H01M 10/0409; H01M 10/0587
See application file for complete search history.

(56) References Cited

U.S. PATENT DOCUMENTS

2020/0350609 A1   11/2020   Kim et al.

FOREIGN PATENT DOCUMENTS

| CN | 201233937 Y | 5/2009 |
|----|-------------|--------|
| CN | 201450080 U | 5/2010 |

(Continued)

OTHER PUBLICATIONS

EPO machine generated English translation of CN-105938921-A (Year: 2019).*

(Continued)

*Primary Examiner* — Christopher P Domone
*Assistant Examiner* — Kimberly Wyluda
(74) *Attorney, Agent, or Firm* — Kilpatrick Townsend & Stockton LLP

(57) ABSTRACT

Provided are a winding device and a winding apparatus. An inner shaft of the winding device is configured to clamp an electrode assembly; and an outer shaft of the winding device is configured to wind the electrode assembly. The winding device includes: a first slider and a first pusher, where the first slider may reciprocate in a first sliding slot in the first pusher in a first direction, and an extension direction of the first sliding slot is inclined from the first direction such that the first pusher drives a first inner shaft to reciprocate in a second direction, the second direction being perpendicular to the first direction; and a second slider and a second pusher, where the second slider may reciprocate in a second sliding slot in the second pusher in a third direction, and an extension direction of the second sliding slot is inclined from the third direction.

20 Claims, 16 Drawing Sheets

(56) References Cited

FOREIGN PATENT DOCUMENTS

| CN | 105938921 | A | | 9/2016 | |
|---|---|---|---|---|---|
| CN | 111656592 | A | | 9/2020 | |
| CN | 113241464 | A | * | 8/2021 | ........ H01M 10/0409 |
| CN | 113659217 | A | | 11/2021 | |
| JP | 2012020876 | A | | 2/2012 | |

OTHER PUBLICATIONS

EPO machine generated English translation of CN-113241464-A (Year: 2021).*
International search report received in the corresponding international application PCT/2022/072826, dated Sep. 28, 2022.
Written opinion received in the corresponding international application PCT/2022/072826, dated Sep. 28, 2022.

* cited by examiner

C-C

# WINDING DEVICE AND WINDING APPARATUS

CROSS-REFERENCE TO RELATED APPLICATIONS

This application is a continuation of International Application PCT/CN2022/072826, filed Jan. 19, 2022 and entitled "WINDING DEVICE AND WINDING APPARATUS", which is incorporated herein by reference in its entirety.

TECHNICAL FIELD

The present application relates to the technical field of batteries, and more particularly to a winding device and a winding apparatus.

BACKGROUND ART

A winding device can be used to wind electrode assemblies into wound structures. The winding device may include an inner shaft and an outer shaft, where the inner shaft may be used to clamp an electrode assembly during winding, and the outer shaft may be used to bear the remaining portion of the electrode assembly, such that the electrode assembly may be wound around an outer periphery of the outer shaft. After the winding is finished, the inner shaft may release the electrode assembly, and the outer shaft may contracts to decrease an outer diameter of the outer shaft to facilitate separation of the electrode assembly from the winding device.

A cooperative movement between the inner shaft and the outer shaft may cause a series of process problems that may reduce the yield or service performance the electrode assembly of the wound structure.

SUMMARY

The present application provides a winding device and a winding apparatus, with a view to improving the yield or service performance of an electrode assembly of a wound structure.

A first aspect provides a winding device, including: a first inner shaft and a second inner shaft that are arranged opposite to each other and configured to clamp an electrode assembly; and a first outer shaft and a second outer shaft that are arranged opposite to each other, outer peripheries of the first outer shaft and the second outer shaft being configured to wind the electrode assembly; the winding device further comprising a first slider and a first pusher, wherein the first pusher is fixedly connected to the first inner shaft, the first pusher is provided with a first sliding slot, the first slider is movable in the first sliding slot, the first slider is configured to reciprocate in a first direction, and an extension direction of the first sliding slot is inclined from the first direction such that the first pusher drives the first inner shaft to reciprocate in a second direction so as to clamp or release the electrode assembly, the second direction being perpendicular to the first direction; and the winding device further comprising a second slider and a second pusher, wherein the second pusher is fixedly connected to the first outer shaft, the second pusher is provided with a second sliding slot, the second slider is movable in the second sliding slot, the second slider is configured to reciprocate in a third direction, and an extension direction of the second sliding slot is inclined from the third direction such that the second pusher drives the first outer shaft to reciprocate in a fourth direction so as to increase or decrease a distance between the first outer shaft and the second outer shaft, the third direction being parallel to the first direction, and the fourth direction being perpendicular to the third direction.

In the solution provided in the present application, the first inner shaft and the first outer shaft may be controlled separately by means of the cooperation of the first slider and the first sliding slot of the first pusher as well as the cooperation of the second slider and the second sliding slot of the second pusher. With the winding device and the winding apparatus provided in the present application, when the electrode assembly is removed, the inner shaft may firstly release the electrode assembly, and an outer perimeter of the outer shaft is then decreased, which is beneficial to reduce the possibility of the electrode assembly being tensioned by a convex corner of the outer shaft, and is thus beneficial to improve the processing quality and service performance of the electrode assembly.

In a possible implementation, the winding device further includes: a first adjustment rod that is arranged parallelly relative to the first direction, wherein the first adjustment rod is fixedly connected to the first slider, and the first adjustment rod is configured to reciprocate in the first direction so as to drive the first slider to reciprocate in the first direction; and a second adjustment rod that is arranged parallelly relative to the third direction, wherein the second adjustment rod is fixedly connected to the second slider, and the second adjustment rod is configured to reciprocate in the third direction so as to drive the second slider to reciprocate in the third direction.

In the present application, with the arrangement of the first adjustment rod and the second adjustment rod, it is possible to separately drive the first slider and the second slider at positions remote from the first slider and the second slider, which is conducive to improving the flexibility of driving the first slider and the second slider.

In a possible implementation, the second adjustment rod and the second slider are fixedly connected by means of a first connecting shaft, the first adjustment rod comprises a first adjustment rod through hole, and the first connecting shaft runs through the first adjustment rod through hole and is capable of reciprocating in the first adjustment rod through hole in the third direction.

In the present application, in order to enable the first slider and the second slider to move separately, the first adjustment rod may be provided with the first adjustment rod through hole in which the first connecting shaft can move, such that the first connecting shaft and the second slider can reciprocate together in the third direction relative to the first adjustment rod, thereby facilitating disengagement of the second slider from a linkage relationship with the first adjustment rod. The first adjustment rod through hole may further form a movement track for the first connecting shaft. The first adjustment rod through hole may be conducive to reducing a movement offset of the second slider.

In a possible implementation, the size of the first adjustment rod through hole in the third direction is greater than or equal to a movement stroke of the second slider in the third direction.

In the present application, rationally setting the size of the first adjustment rod through hole in the third direction is conducive to preventing the first adjustment rod through hole from blocking the movement of the first connecting shaft, or to implementing limiting on the first connecting shaft.

In a possible implementation, the first adjustment rod and the first slider are fixedly connected by means of a second connecting shaft, the second adjustment rod comprises a second adjustment rod through hole, and the second connecting shaft runs through the second adjustment rod through hole and may reciprocate in the second adjustment rod through hole in the first direction.

In the present application, in order to enable the first slider and the second slider to move separately, the second adjustment rod may be provided with a second adjustment rod through hole in which the second connecting shaft can move, such that the second connecting shaft and the first slider can reciprocate together in the first direction relative to the second adjustment rod, thereby enabling facilitating disengagement of the first slider from a linkage relationship with the second adjustment rod. The second adjustment rod through hole may further form a movement track for the second connecting shaft. The second adjustment rod through hole may be conducive to reducing a movement offset of the first slider.

In a possible implementation, the size of the second adjustment rod through hole in the first direction is greater than or equal to a movement stroke of the first slider in the first direction.

In the present application, rationally setting the size of the first adjustment rod through hole in the third direction is conducive to preventing the first adjustment rod through hole from blocking the movement of the first connecting shaft, or to implementing limiting on the first connecting shaft.

In a possible implementation, one end of the second adjustment rod is provided with an adjustment rod protrusion, and the adjustment rod protrusion protrudes toward the first adjustment rod in a direction perpendicular to the first direction.

In the present application, The arrangement of the adjustment rod protrusion on the second adjustment rod allows the portion of the second adjustment rod protruding from the first adjustment rod can correspond to a central area of the first pusher, which is conducive to reducing the possibility of the second adjustment rod is offset in direction during the movement.

In a possible implementation, the winding device further includes: an inner shaft holder configured to house the first inner shaft, the first slider, the first pusher, the second slider and the second pusher, where the inner shaft holder has a first holder cavity and a second holder cavity, the first holder cavity is configured to house the first pusher, an opening of the second holder cavity faces the first outer shaft, and the second holder cavity is configured to house the second pusher.

In the present application, arranging a plurality of movable members together on the inner shaft holder is conducive to improving the integration of the device.

In a possible implementation, the winding device further includes: a first driving rod configured to apply a driving force in the first direction to the first adjustment rod; and a second driving rod configured to apply a driving force in the third direction to the second adjustment rod; where the first driving rod and the second driving rod are located at two sides of the inner shaft holder.

In the present application, the provisions of the first driving rod and the second driving rod enable separate driving of the first slider and the second slider from different positions, which is conducive to reducing the possibility of mutual interference between the first slider and the second slider.

In a possible implementation, the winding device further includes: a first elastic element configured to apply a driving force in a direction opposite to the first direction, to the first adjustment rod; and a second elastic element configured to apply a driving force in a direction opposite to the third direction, to the second adjustment rod.

In the present application, the first elastic element and the second elastic element are arranged such that the first adjustment rod and the second adjustment rod can return to their initial positions after the movement.

In a possible implementation, the winding device further includes: a winding shaft seat, wherein the winding shaft seat has a winding shaft seat cavity with an opening facing the inner shaft holder, the first adjustment rod extends into the winding shaft seat cavity, and the first elastic element abuts against a bottom wall of the winding shaft seat cavity.

In the present application, the first elastic element abuts against the bottom wall of the winding shaft seat cavity such that the first adjustment rod may move in the first direction relative to the winding shaft seat cavity.

In a possible implementation, the bottom wall of the winding shaft seat cavity is provided with a winding shaft seat through hole, and the first driving rod runs through the winding shaft seat through hole and extends into the winding shaft seat cavity; and the winding device further comprises a drive slider housed inside the winding shaft seat cavity, the drive slider is fixedly connected to the first adjustment rod and is fixed relative to the first driving rod in the first direction, and the first elastic element abuts between the drive slider and the winding shaft seat.

In the present application, it is conducive to reducing the possibility of the movement of the first adjustment rod deviating from the first direction by arranging the drive slider in the winding shaft seat and controlling the reciprocation of the first adjustment rod in the first direction by means of the drive slider.

In a possible implementation, the winding device further includes a connecting seat located between the winding shaft seat and the inner shaft holder and covering the opening of the winding shaft seat cavity, the connecting seat comprises a connecting seat through hole, and the first adjustment rod runs through the connecting seat through hole.

In the present application, the connecting seat may be connected between the inner shaft holder and the winding shaft seat to provide a transition effect, and is conducive to reduce an outflow of particulates from the winding shaft seat.

In a possible implementation, one end of the second elastic element is fixed to the inner shaft holder, and the other end of the second elastic element abuts against the second adjustment rod.

In the present application, the second elastic element is arranged such that the second adjustment rod is movable in a direction opposite to the third direction relative to the inner shaft holder.

In a possible implementation, the winding device further includes: a support portion housed in the inner shaft holder, the support portion being provided with movement grooves for the first adjustment rod and the second adjustment rod.

In the present application, providing the movement grooves in the support portion is conducive to limiting the movements of the first adjustment rod and the second adjustment rod in the first direction or the third direction, and is conducive to reducing the possibility of the deviating movements of the first adjustment rod and the second adjustment rod.

In a possible implementation, the support portion includes a support portion opening, and the winding device further comprises a third pusher, wherein the third pusher runs through the support portion opening and is fixedly connected to the second adjustment rod, the third pusher is used to apply a driving force in the third direction to the second adjustment rod, and an inner diameter of the support portion opening in the third direction is greater than or equal to the stroke of the second adjustment rod in the third direction.

In the present application, the support portion opening may be used to limit a farthest stop position of the third pusher, and may thus be used to limit farthest stop positions of the second slider and the second pusher.

In a possible implementation, the inner shaft holder further includes a third sliding slot in communication with the first holder cavity, wherein a body of the first pusher is housed inside the first holder cavity; the first pusher further comprises a first pusher protrusion, where the first pusher protrusion is slidable in the third sliding slot in the second direction, and a sliding clearance between the first pusher protrusion and the third sliding slot is smaller than a sliding clearance between the body of the first pusher and the first holder cavity.

In the present application, the degree of sliding friction between the body of the first pusher and the first holder cavity may be lower than the degree of sliding friction between the first pusher protrusion and the third sliding slot. Thus, a main friction region of the first pusher may be concentrated on the first pusher protrusion, which is conductive to reducing the friction involved by the body of the first pusher. A contact area between the first pusher protrusion and the third sliding slot is small, and therefore, the overall degree of friction between the first pusher protrusion and the third sliding slot is small. The third sliding slot may, for example, act as a guide rail for the first pusher, and a pushing portion of the first pusher may, for example, act as a guide rail mating member of the first pusher.

In a possible implementation, the winding device further includes a cover plate covering the end of the first holder cavity and/or the third sliding slot close to the first outer shaft.

In the present application, by covering the cover plate on the end of the first holder cavity and/or the third sliding slot close to the first outer pin, it is conductive to reducing the possibility of the particulates falling out through a gap between the first pusher and the first holder cavity and/or between the first pusher and the third sliding slot.

In a possible implementation, the inner shaft holder further includes a fourth sliding slot in communication with the second holder cavity, where a body of the second pusher is housed inside the second holder cavity; the second pusher further includes a second pusher protrusion, where the second pusher protrusion is slidable in the fourth sliding slot in the fourth direction, and a sliding clearance between the second pusher protrusion and the fourth sliding slot is smaller than a sliding clearance between the body of the second pusher and the second holder cavity.

In the present application, the degree of sliding friction between the body of the second pusher and the second holder cavity may be lower than the degree of sliding friction between the second pusher protrusion and the fourth sliding slot. Thus, a main friction region of the second pusher may be concentrated in the second pusher protrusion, which is conducive to reducing the amount of friction involved by the body of the second pusher. A contact area between the second pusher protrusion and the fourth sliding slot is small, and therefore, the overall degree of friction between the second pusher protrusion and the fourth sliding slot is small. The fourth sliding slot may, for example, act as a guide rail for the second pusher, and a pushing portion of the second pusher may, for example, act as a guide rail mating member of the second pusher.

In a possible implementation, the winding device further includes a cover plate covering the end of the fourth sliding slot close to the first outer shaft.

In the present application, covering the cover plate on the end of the fourth sliding slot close to the first outer shaft is conducive to reduce the possibility of particulates falling out through a gap between the second pusher and the fourth sliding slot.

In a possible implementation, the opening of the first sliding slot away from the first slider is covered by a cover plate; and/or the opening of the second sliding slot away from the second slider is covered by a cover plate; and/or the inner shaft holder comprises a first sliding slot opening, wherein the first sliding slot opening is arranged opposite to the first sliding slot in the first pusher, and the first sliding slot opening is covered by a cover plate; and/or the inner shaft holder includes a second sliding slot opening, where the second sliding slot opening is arranged opposite to the second sliding slot in the second pusher, and the second sliding slot opening is covered by a cover plate.

In the present application, the arrangement of the cover plates on the plurality of openings is conducive to reducing the possibility of particulates falling out through the openings, thus reducing the possibility of particulates falling onto the electrode assembly.

In a possible implementation, the winding device further includes: a threaded fastener, where the first inner shaft and the first pusher are fixedly connected by means of the threaded fastener, the inner shaft holder comprises a locking opening, the locking opening is arranged opposite to the threaded fastener and is covered by a cover plate.

In the present application, fixedly connecting the first inner shaft to the first pusher by means of the threaded fastener is conducive to improving the connection stability of the first inner shaft and the first pusher.

In a possible implementation, the winding device further includes: a magnetic component arranged at the inner shaft holder and configured to attract particulates in the inner shaft holder.

In the present application, the magnetic component is arranged in the inner shaft holder such that the magnetic component can attract particulates around a path in which the particulates may pass, and the possibility of the particulates falling onto the electrode assembly is thus reduced.

In a possible implementation, the winding device includes at least one magnetic component, where the at least one magnetic component is arranged in at least one of the following positions: on a side of the first inner shaft facing the first pusher; on a side of the first pusher facing the first inner shaft; on a side of the second pusher facing the inner shaft holder; on a side of the inner shaft holder facing the second pusher; on a position of the inner shaft holder close to the first sliding slot; in a part of the inner shaft holder close to the second sliding slot; on a side of the inner shaft holder close to the first inner shaft; and on a side of the first inner shaft close to the inner shaft holder.

In the present application, the magnetic components are arranged at a plurality of positions such that it is conducive to reduce the possibility of particulates falling to the electrode assembly.

In a possible implementation, the first direction is the same as the third direction, and in the first direction, the first sliding slot extends away from the second inner shaft, and the second sliding slot extends close to the second inner shaft.

In the present application, the first slider and the second slider are identical in driving direction, which is conducive to reducing the number of times of determining the driving directions of the first slider and the second slider during winding of the electrode assembly, and is conducive to improving the simplicity of a winding process.

A second aspect provides a winding apparatus. The winding apparatus includes: the winding device as described in the first aspect or any possible implementation of the first aspect; and a driving device configured to drive the winding device.

The embodiments of the present application provide a winding device and a winding apparatus, which have a characteristic of separately adjusting the perimeters of an inner shaft and an outer shaft. The winding device and the winding apparatus may be applied in the winding production of an electrode assembly. In addition, the provisions of the cover plate, the magnetic component and the magnetic cover plate are conducive to reducing the possibility of the particulates in the winding device falling onto the electrode assembly, thereby improving the production quality of the electrode assembly.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

Figure 1:
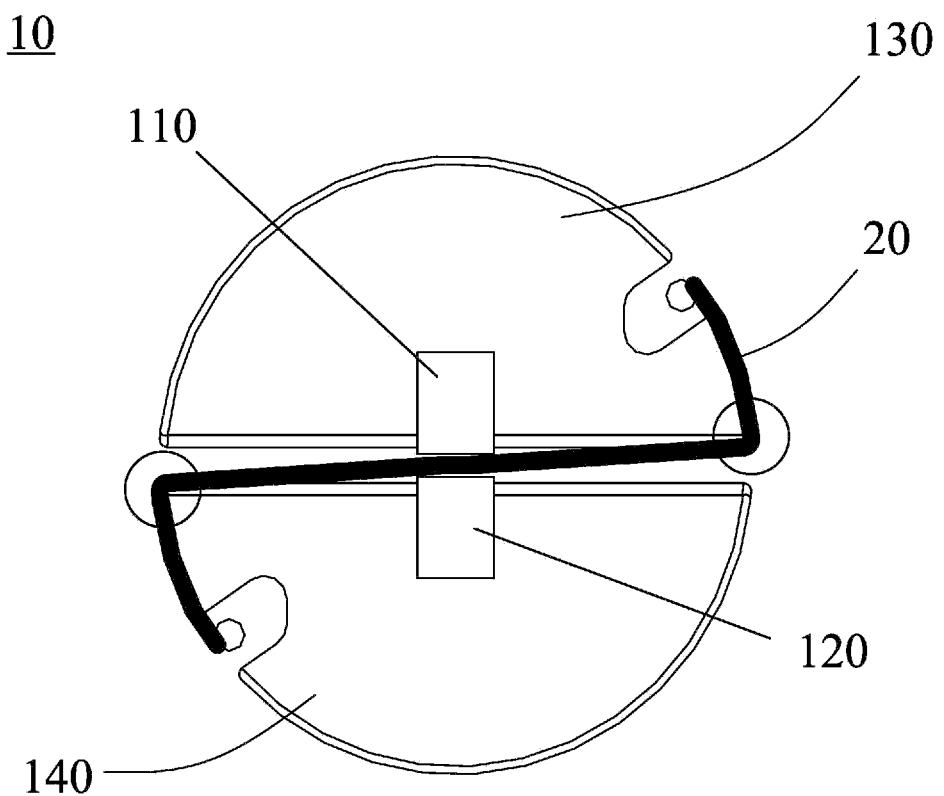
FIG. 1 is a schematic structural diagram of a winding device according to an embodiment of the present application.

In the accompanying drawings, the figures are not drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

In the present application, a battery refers to a single physical module including one or more battery cells to provide electric energy. For example, the battery mentioned in the present application may include a battery module, a battery pack, etc. The battery generally includes a case for enclosing one or more battery cells. The case can prevent liquid or other foreign matters from affecting charging or discharging of the battery cell.

Optionally, the battery cell may include a lithium ion secondary battery, a lithium ion primary battery, a lithium-sulfur battery, a sodium/lithium ion battery, a sodium ion battery or a magnesium ion battery, etc., which is not limited in the embodiments of the present application. In some embodiments, the battery cell may also be referred to as a cell.

The battery cell includes an electrode assembly and an electrolyte. The electrode assembly is composed of a positive electrode plate, a negative electrode plate and a separator. The operation of the battery cell mainly relies on movements of metal ions between the positive electrode plate and the negative electrode plate. The positive electrode plate comprises a positive electrode current collector and a positive electrode active material layer. A surface of the positive electrode current collector is coated with the positive electrode active material layer, the current collector not coated with the positive electrode active material layer protrudes from the current collector coated with the positive electrode active material layer, and the current collector not coated with the positive electrode active material layer is used as a positive tab. Taking a lithium ion battery as an example, a material of the positive electrode current collector may be aluminum, and the positive electrode active material may be lithium cobalt oxide, lithium iron phosphate, ternary lithium, lithium manganate, etc. The negative electrode plate comprises a negative electrode current collector and a negative electrode active material layer. A surface of the negative electrode current collector is coated with the negative electrode active material layer, the current collector not coated with the negative electrode active material layer protrudes from the current collector coated with the negative electrode active material layer, and the current collector not coated with the negative electrode active material layer is used as a negative tab. A material of the negative electrode current collector may be copper, and the negative electrode active material may be carbon, silicon, etc. In order to ensure that no fusing occurs when a large current passes, a plurality of positive tabs are provided and are stacked together, and a plurality of negative tabs are provided and are stacked together. A material of the separator may be Polypropylene (PP) or Polyethylene (PE), etc.

The electrode assembly having a wound structure may be manufactured by means of a winding apparatus. The winding apparatus may include a driving device and a winding device. The driving device may be used to drive the winding device to rotate so as to implement winding of the electrode assembly. The winding device may fix the electrode assembly during the winding. By driving the winding device to rotate by the driving device, the electrode assembly may be wound around an outer periphery of the winding device, such that the electrode assembly having a wound structure can be obtained.

FIG. 1 is a schematic structural diagram of a winding device 10 according to an embodiment of the present application. The winding device 10 may include a first inner shaft 110 and a second inner shaft 120 that are arranged opposite to each other, where the first inner shaft 110 and the second inner shaft 120 may be used to clamp an electrode assembly 20; and the winding device 10 may further include a first outer shaft 130 and a second outer shaft 140 that are arranged opposite to each other, where outer peripheries of the first outer shaft 130 and the second outer shaft 140 may be used to wind the electrode assembly 20.

The first inner shaft 110 and the second inner shaft 120 may form an inner shaft assembly of the winding device 10, and the first outer shaft 130 and the second outer shaft 140 may form an outer shaft assembly of the winding device 10. The outer shaft assembly may have an accommodation space for accommodating the inner shaft assembly such that the inner shaft assembly can be arranged inside the outer shaft assembly. The inner shaft assembly may be used to clamp the electrode assembly 20, and an outer periphery of the outer shaft assembly may be used to bear and wind the electrode assembly 20. During the winding, a portion of the electrode assembly 20 may be located inside the outer shaft assembly and clamped by the inner shaft assembly, and the other portions of the electrode assembly 20 may extend from an inside of the outer shaft assembly and be wound around the outer periphery of the outer shaft assembly.

After a winding process is completed, the electrode assembly 20 may be removed from the winding device 10 shown in FIG. 1. In order to facilitate the removal of the electrode assembly 20, the first inner shaft 110 and the second inner shaft 120 can move away from each other, and a distance between the first inner shaft 110 and the second inner shaft 120 may be increased, such that the first inner shaft 110 and the second inner shaft 120 can release the electrode assembly 20; and the first outer shaft 130 and the second outer shaft 140 may move closer to each other, and a distance between the first outer shaft 130 and the second outer shaft 140 may be decreased, such that the outer peripheries of the first outer shaft 130 and the second outer shaft 140 can get out of contact with the electrode assembly 20.

As shown in FIG. 1, the first outer shaft 130 may include a first end surface and a first outer surface, where the first end surface is a surface of the first outer shaft 130 facing the second outer shaft 140, and the first outer surface is a surface of the first outer shaft 130 facing away from the first outer shaft 130. A connection between the first end surface and the first outer surface may form a convex corner, for example, a circled position shown in FIG. 1. The convex corner may move toward the electrode assembly 20 as the first outer shaft 130 approaches the second outer shaft 140.

In a possible case, the first inner shaft 110 and the first outer shaft 130 are driven by a same driving member, such that a process of moving the first inner shaft 110 away from the second inner shaft 120 and a process of moving the first outer shaft 130 close to the second outer shaft 140 can be performed simultaneously. This may mean that when the first inner shaft 110 and the second inner shaft 120 do not completely release the electrode assembly 20, a distance between the convex corner and the electrode assembly 20 is quite short, or even the convex corner may be in contact with the electrode assembly 20. As the first outer shaft 130 approaches the second outer shaft 140, the convex corner may locally tension the electrode assembly 20, increasing the possibility of breakage of the electrode assembly 20, which in turn reduces the processing quality and service performance of the electrode assembly 20.

In view of the above problem, the embodiments of the present application provide a winding device and a winding apparatus, in which an inner shaft and an outer shaft are driven by means of different driving members respectively to achieve separate control of the inner shaft and the outer shaft, such that a process of increasing a perimeter of the inner shaft and a process of decreasing a perimeter of the outer shaft can be performed independently.

Figure 2:
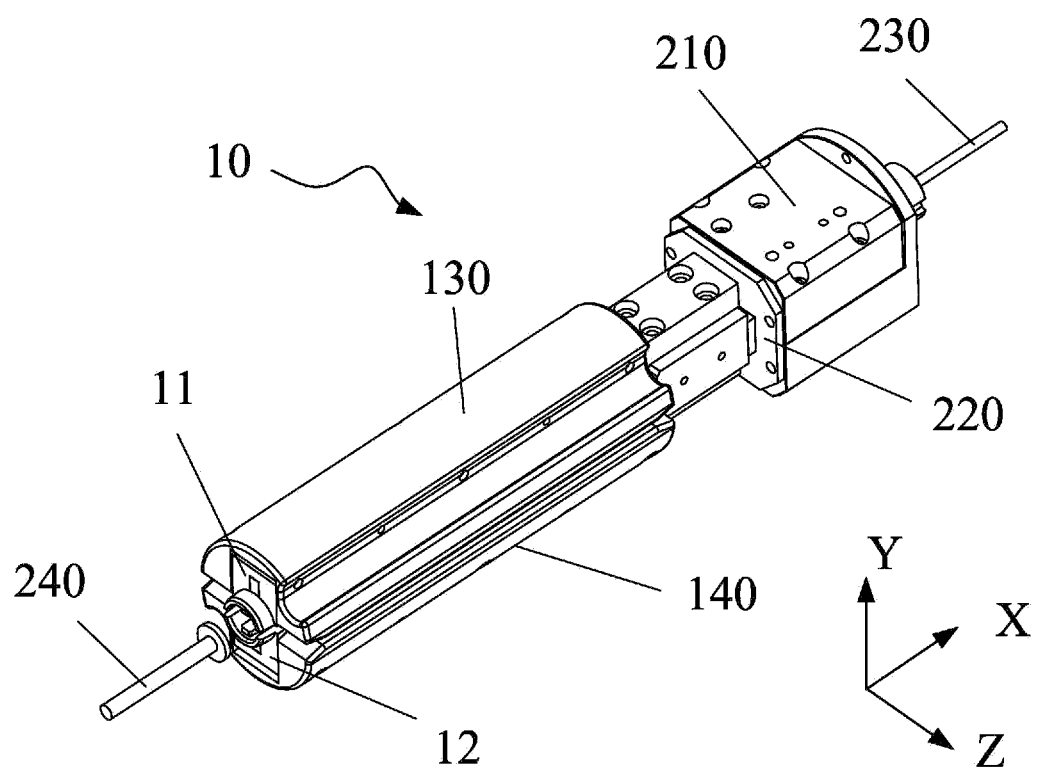
FIG. 2 is a schematic structural diagram of a winding device according to an embodiment of the present application.
Figure 3:
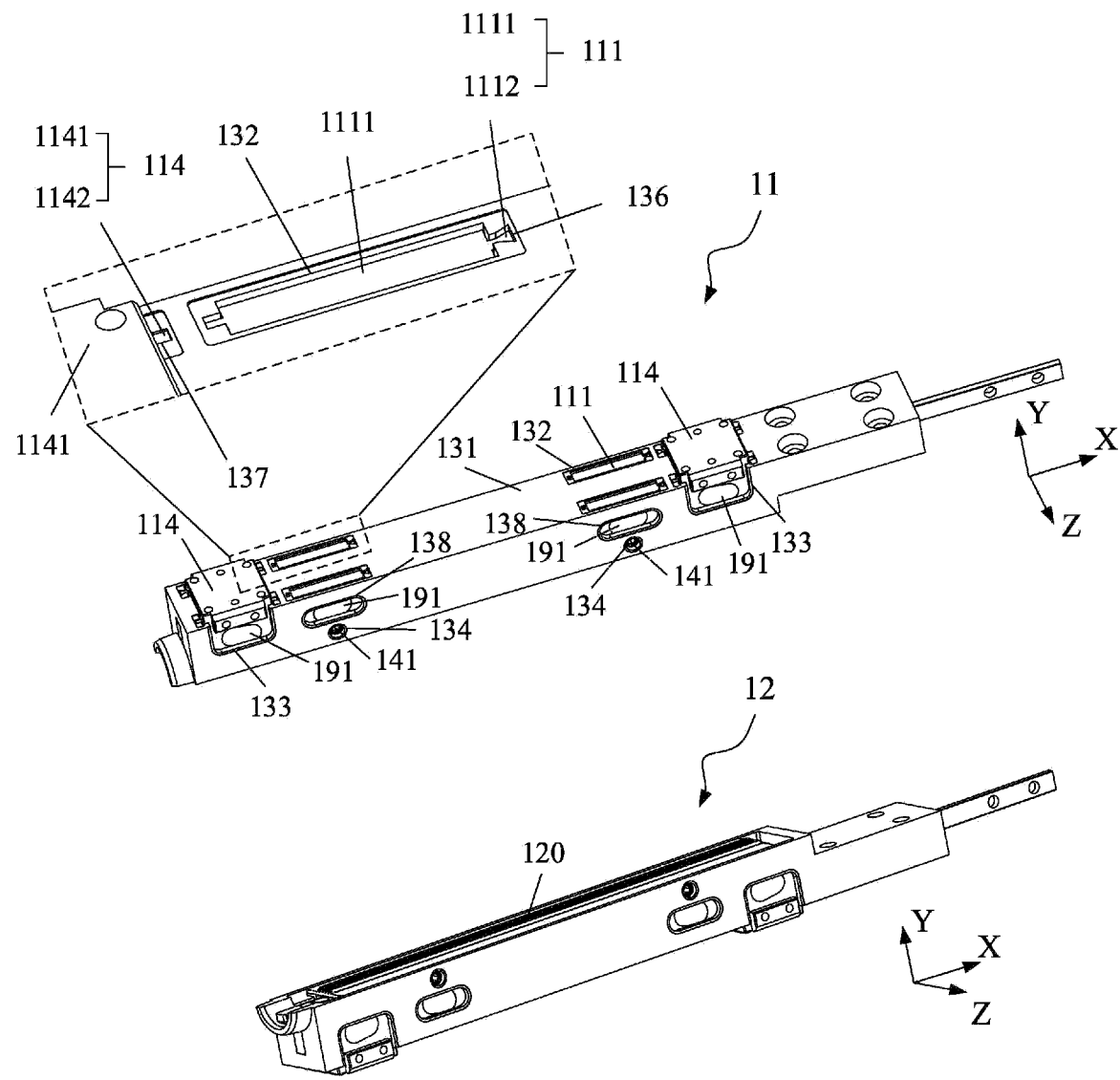
FIG. 3 is a schematic structural diagram illustrating a first inner shaft assembly and a second inner shaft assembly according to an embodiment of the present application.
Figure 4:
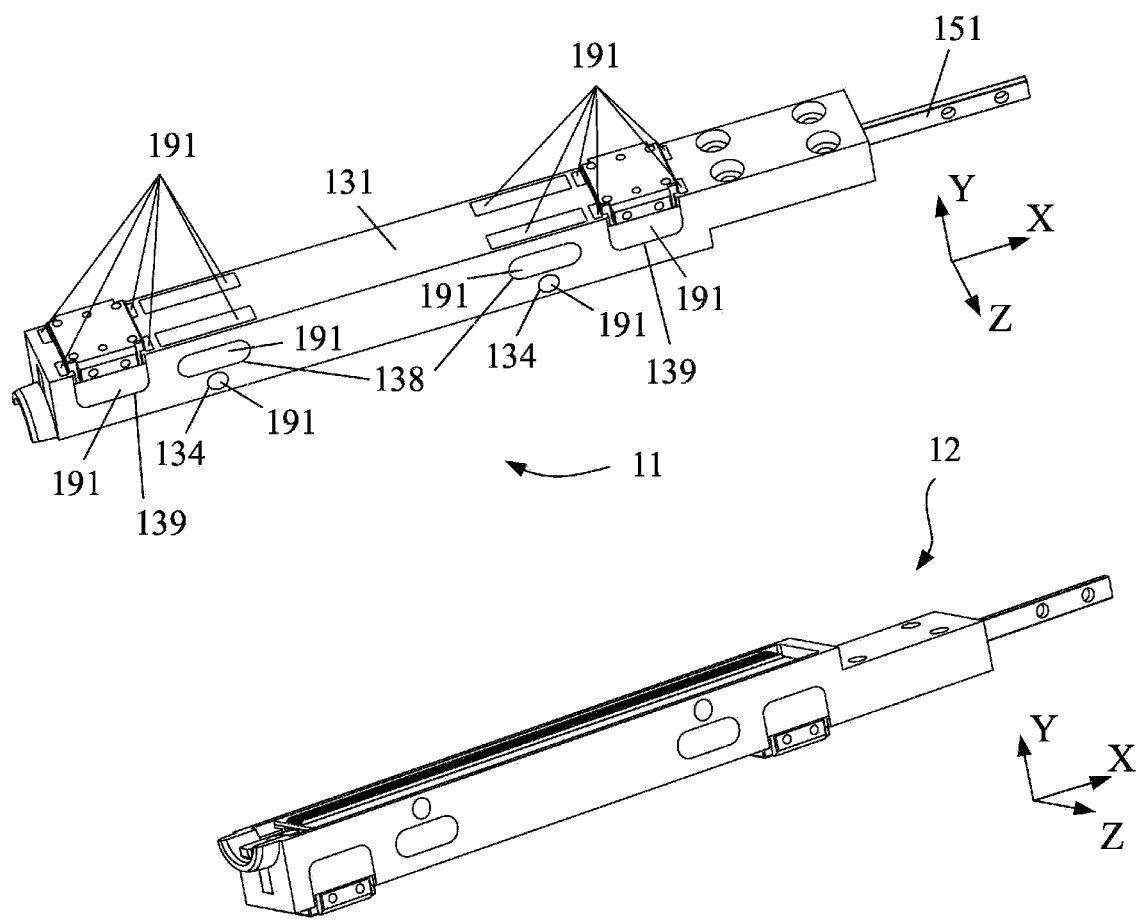
FIG. 4 is a schematic structural diagram illustrating a first inner shaft assembly and a second inner shaft assembly according to an embodiment of the present application.

FIG. 2 is a schematic structural diagram of a winding device 10 according to an embodiment of the present application. The winding device 10 shown in FIG. 2 may be applied to the winding apparatus. FIGS. 3-4 illustrate perspective structural diagrams of a first inner shaft assembly 11 and a second inner shaft assembly 120 according to an embodiment of the present application. Embodiments of related inner shaft assemblies provided by the present application are described mainly with the first inner shaft assembly 11 as an example in the present application. For embodiments of the second inner shaft assembly 120, embodiments of the first inner shaft assembly 11 may be referred to.

The winding device 10 may include a first inner shaft 110 and a second inner shaft 120 that are arranged opposite to each other, where the first inner shaft 110 and the second inner shaft 120 may be used to clamp the electrode assembly 20 shown in FIG. 1; and the winding device 10 may further include a first outer shaft 130 and a second outer shaft 140 that are arranged opposite to each other, where outer peripheries of the first outer shaft 130 and the second outer shaft 140 may be used to wind the electrode assembly 20.

Referring to FIGS. 2-5, the winding device 10 may include a first inner shaft assembly 11, a second inner shaft assembly 12, a first outer shaft assembly, and a second outer shaft assembly. The first inner shaft assembly 11 may include the first inner shaft 110, the second inner shaft assembly 12 may include the second inner shaft 120, the first outer shaft assembly may include the first outer shaft 130, and the second outer shaft assembly may include the second outer shaft 140. The first inner shaft 110 may be located on a side of the first inner shaft assembly 11 facing the second inner shaft assembly 12. The second inner shaft 120 may be located on a side of the second inner shaft assembly 12 facing the first inner shaft assembly 11. In some embodiments, the first outer shaft 130 may be located on a side of the first outer shaft assembly facing away from the second outer shaft assembly. The second outer shaft 140 may be located on a side of the second outer shaft assembly facing away from the first outer shaft assembly.

The first inner shaft assembly 11 and the second inner shaft assembly 12 may be located in a space between the first outer shaft assembly (or the first outer shaft 130) and the second outer shaft assembly (or the second outer shaft 140). A side of the first outer shaft assembly close to the second outer shaft assembly may have a first accommodating space in which the first inner shaft assembly 11 may be arranged. A side of the second outer shaft assembly close to the first outer shaft assembly may have a second accommodating space in which the second inner shaft assembly 12 may be arranged.

In some embodiments, the first inner shaft 110 of the first inner shaft assembly 11 may be moved closer to the second inner shaft 120 of the second inner shaft assembly 12 so as to decrease a distance between the first inner shaft 110 and the second inner shaft 120. An electrode can be clamped by the first inner shaft 110 and the second inner shaft 120 by decreasing the distance between the first inner shaft 110 and the second inner shaft 120. The first inner shaft 110 may also be moved away from the second inner shaft 120 so as to increase the distance between the first inner shaft 110 and the second inner shaft 120. The first inner shaft 110 and the second inner shaft 120 can release the electrode by increasing the distance between the first inner shaft 110 and the second inner shaft 120. Similarly, the second inner shaft 120 may be moved toward or away from the first inner shaft 110 so as to adjust the distance between the first inner shaft 110 and the second inner shaft 120.

In some embodiments, the first inner shaft assembly 11 and the first outer shaft assembly (or the first outer shaft 130) may be moved relative to each other. For example, the first outer shaft assembly may be moved toward or away from the first inner shaft assembly 11, and thus peripheral profiles of the first outer shaft 130 and the second outer shaft 140 may be reduced or expanded. In a possible case, the second inner shaft assembly 12 and the second outer shaft assembly (or the second outer shaft 140) may be moved relative to each other. In another possible case, a side of the second inner shaft assembly 12 facing the second outer shaft assembly may be fixed to the second outer shaft assembly.

An outer surface of the first outer shaft 130 away from the second outer shaft 140, and an outer surface of the second outer shaft 140 away from the first outer shaft 130 may be used to be in contact with the electrode assembly 20. After the first inner shaft 110 and the second inner shaft 120 clamp the electrode assembly 20, the electrode assembly 20 may extend from the space between the first outer shaft 130 and the second outer shaft 140 and may be attached to the outer surface of the first outer shaft 130 away from the second outer shaft 140 and the outer surface of the second outer shaft 140 away from the first outer shaft 130, such that the electrode assembly 20 can surround the outer peripheries of the first outer shaft 130 and the second outer shaft 140.

In some embodiments, the distance between the end surface of the first outer shaft 130 close to the second outer shaft 140 and the end surface of the first inner shaft assembly 11 close to the second inner shaft assembly 12 may be relatively small. For example, the end surface of the first outer shaft 130 close to the second outer shaft 140 may be flush with the end surface of the first inner shaft assembly 11 close to the second inner shaft assembly 12. This is conducive to increasing a contact area between the first outer shaft 130 and the electrode assembly 20, and thus is conducive to reducing the probability of the electrode assembly 20 being scratched and punctured by the first outer shaft assembly. Similarly, the distance between the end surface of the second outer shaft 140 close to the first outer shaft 130 and the end surface of the second inner shaft assembly 12 close to the first inner shaft assembly 11 may be small.

The outer surface of the first outer shaft 130 away from the second outer shaft 140 may be matched with a wound structure of the electrode assembly 20 in shape. For example, when the wound structure of the electrode assembly 20 is an elliptic cylindrical structure, a cross-sectional curve of the outer surface of the first outer shaft 130 away from the second outer shaft 140 may be an elliptical arc (which may be an arc section of an ellipse). In the embodiment shown in FIG. 2, the outer surface of the first outer shaft 130 away from the second outer shaft 140 may be in a form of a circular arc, such that the wound structure of the electrode assembly 20 may be a cylindrical structure. The embodiments of the present application may not limit a specific wound structure of the electrode assembly and a specific shape of the outer surface of the first outer shaft 130 away from the second outer shaft 140. Similarly, the outer surface of the second outer shaft 140 away from the first outer shaft 130 may be matched with the wound structure of the electrode assembly 20 in shape.

Figure 5:
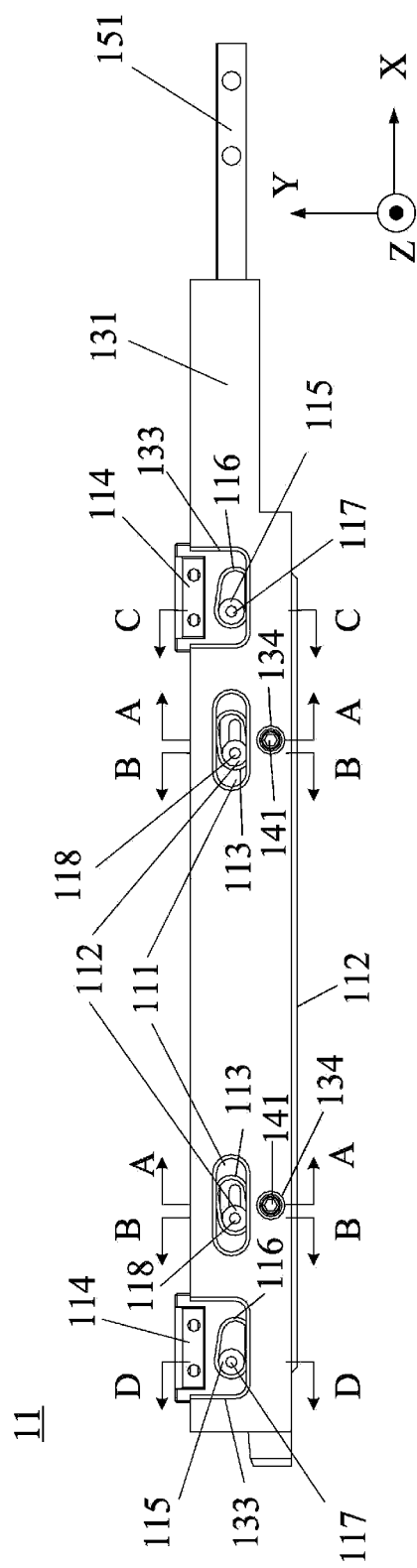
FIG. 5 is a schematic structural diagram of a first inner shaft assembly according to an embodiment of the present application.

FIG. 5 illustrates a plane structural diagram of the first inner shaft assembly 11 according to an embodiment of the present application.

The winding device 10 may further include a first slider 112 and a first pusher 111, where the first pusher 111 is fixedly connected to the first inner shaft 110, the first pusher 111 is provided with a first sliding slot 113, the first slider 112 is movable in the first sliding slot 113, the first slider 112 is configured to reciprocate in a first direction, and an extension direction of the first sliding slot 113 is inclined from the first direction such that the first pusher 111 drives the first inner shaft 110 to reciprocate in a second direction so as to clamp or release the electrode assembly 20, the second direction being perpendicular to the first direction.

The winding device 10 further includes a second slider 115 and a second pusher 114, where the second pusher 114 is fixedly connected to the first outer shaft 130, the second pusher 114 is provided with a second sliding slot 116, the second slider 115 is movable in the second sliding slot 116, and the second slider 115 is configured to reciprocate in a third direction, an extension direction of the second sliding slot 116 is inclined from a third direction such that the second pusher 114 drives the first outer shaft 130 to reciprocate in a fourth direction so as to increase or decrease the distance between the first outer shaft 130 and the second outer shaft 140, the third direction being parallel to the first direction, and the fourth direction being perpendicular to the third direction.

As shown in FIGS. 2-5, assuming that there is an XYZ coordinate system, where an X-axis direction, an Y-axis direction and an Z-axis direction are orthogonal to each other. The extension directions of the first inner shaft 110, the second inner shaft 120, the first outer shaft 130, and the second outer shaft 140 may be parallel to the X-axis direction.

the distance between the first inner shaft 110 and the second inner shaft 120 can be decreased by driving the first inner shaft 110 to move in a Y− direction and/or by driving the second inner shaft 120 to move in a Y+ direction. Similarly, the distance between the first inner shaft 110 and the second inner shaft 120 can be increased by driving the first inner shaft 110 to move in the Y+ direction and/or by driving the second inner shaft 120 to move in the Y− direction. An embodiment of driving the first inner shaft 110 will be described below as an example, and for an embodiment of driving the second inner shaft 120, the embodiment of driving the first inner shaft 110 may be referred to.

An included angle between the extension direction of the first sliding slot 113 and the X-axis direction may be represented by α, where α≠0. The extension direction of the first sliding slot 113 may have a first component parallel to the axis X and a second component parallel to the axis Y. In an embodiment provided by the present application, as shown in FIG. 5, the first component may be co-directional with an X+ direction and the second component may be co-directional with the Y+ direction. Alternatively, the first component may be co-directional with an X− direction and the second component may be co-directional with the Y− direction.

When the first slider 112 moves in the first sliding slot 113 of the first pusher 111 in the X+ direction, a displacement component of the first slider 112 in the Y-axis direction may be zero, relatively small, or even be negligible. Since the extension direction of the first sliding slot 113 has a component in the Y-axis direction, the first slider 112 may apply a pushing force to the first sliding slot 113 such that the first pusher 111 provided with the first sliding slot 113 can be moved in the Y− direction. Since the first pusher 111 is connected to the first inner shaft 110, the first inner shaft 110 can be moved toward the second inner shaft 120 under the push of the first pusher 111.

With respect to FIGS. 3-5, the distance between the first outer shaft 130 and the second outer shaft 140 can be decreased by driving the first outer shaft 130 to move in the Y− direction and/or by driving the second outer shaft 140 to move in the Y+ direction. Similarly, the distance between the first outer shaft 130 and the second outer shaft 140 can be increased by driving the first outer shaft 130 to move in the Y+ direction and/or by driving the second outer shaft 140 to move in the Y− direction. An embodiment of driving the first outer shaft 130 will be described below as an example, and for an embodiment of driving the second outer shaft 140, the embodiment of driving the first outer shaft 130 may be referred to.

An included angle between the extension direction of the second sliding slot 116 and the X-axis direction may be represented by β, where β≠0. The extension direction of the second sliding slot 116 may have a third component parallel to the axis X and a fourth component parallel to the axis Y. In an embodiment provided by the present application, the third component may be co-directional with the X+ direction and the fourth component may be co-directional with the Y− direction, or the third component may be co-directional with the X− direction and the fourth component may be co-directional with the Y+ direction.

When the second slider 115 moves in the first sliding slot 116 in the X+ direction, a displacement component of the second slider 115 in the Y-axis direction may be zero, relatively small, or even be negligible. Since the extension direction of the second sliding slot 116 has a component in the Y-axis direction, the second slider 115 can apply a pushing force to the second sliding slot 116, such that the second pusher 114 provided with the second sliding slot 116 can be moved in the Y+ direction. Since the second pusher 114 is connected to the first outer shaft 130, the first outer shaft 130 can be moved away from the second outer shaft 140 under the push of the second pusher 114.

In the embodiment provided by the present application, the first inner shaft 110 can be driven by means of the first slider 112 and the first pusher 111 provided with the first sliding slot 113, and the first outer shaft 130 can be driven by means of the second slider 115 and the second pusher 114 provided with the second sliding slot 116. Therefore, the first inner shaft 110 and the first outer shaft 130 may be separately driven, facilitating flexible adjustment of parameters of a winding process, further facilitating reducing the degree of scratch of the electrode assembly 20 by the first outer shaft 130, and thus facilitating improving the processing quality of the electrode assembly 20.

Optionally, the winding device 10 further includes: an inner shaft holder 131, the inner shaft holder 131 being configured to house the first inner shaft 110, the first slider 112, the first pusher 111, the second slider 115 and the second pusher 114, where the inner shaft holder 131 has a first holder cavity 132 and a second holder cavity 133, the first holder cavity 132 is configured to house the first pusher 111, an opening of the second holder cavity 133 faces the first outer shaft 130, and the second holder cavity 133 is configured to house the second pusher 114.

In the embodiments shown in FIGS. 3-12, the first pusher 111, the first slider 112, the second pusher 114 and the second slider 115 each are the structures of the first inner shaft assembly 11. The first inner shaft assembly 11 may include the inner shaft holder 131 configured to house the first inner shaft 110, the first pusher 111, the first slider 112, the second pusher 114, and the second slider 115. As shown in FIG. 3, the first pusher 111 can reciprocate in the first holder cavity 132 of the inner shaft holder 131 in the second direction, and the second pusher 114 can reciprocate in the second holder cavity 133 of the inner shaft holder 131 in the fourth direction.

In another possible embodiment, the first pusher 111 and the first slider 112 may also be arranged in the first outer shaft assembly shown in FIG. 2. In still another possible embodiment, the second pusher 114 and the second slider 115 may also be arranged in the first outer shaft assembly shown in FIG. 2.

Optionally, the winding device 10 further includes a cover plate 191 covering a side of the inner shaft holder 131 close to the first outer shaft 130.

During the winding, the first pusher 111 is moved in the first holder cavity 132 and the second pusher 114 is moved in the second holder cavity 133, such that sliding friction may occur between the first pusher 111 and the inner shaft holder 131 and between the second pusher 114 and the inner shaft holder 131, thus generating particulates. The particulates may fall onto the electrode assembly 20, and may thus puncture the electrode assembly 20, which in turn reduces the yield of the electrode assembly 20. As shown in FIG. 4, covering the cover plate 191 on the side of the inner shaft holder 131 close to the first outer shaft 130 is conducive to reducing the possibility of the particulates in the inner shaft holder 131 falling out of the inner shaft holder 131.

Optionally, the winding device 10 further includes: a threaded fastener 141, where the first inner shaft 110 and the first pusher 111 are fixedly connected by means of the threaded fastener 141.

Figure 6:
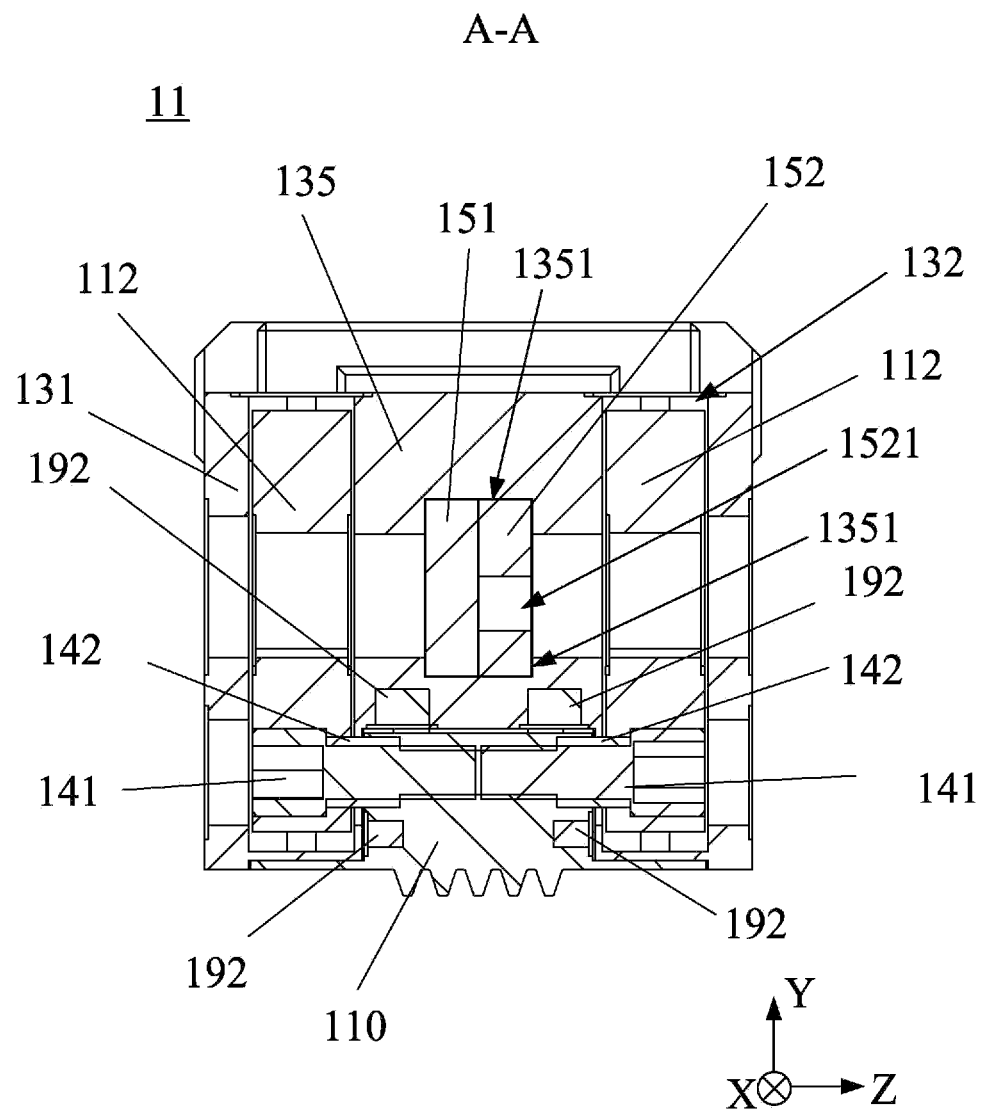
FIG. 6 is a cross-sectional view along plane A-A of the first inner shaft assembly in FIG. 5.

FIG. 6 illustrates a cross-sectional view along plane A-A in FIG. 5. In some embodiments, the first pusher 111 may include a cavity for accommodating the first inner shaft 110, where the first inner shaft 110 may be fixed in the cavity such that the first inner shaft 110 can follow the first pusher 111 to move.

A mounting hole may be provided in the first pusher 111, a threaded hole may be provided in the first inner shaft 110, and the mounting hole and the threaded hole may be arranged opposite to each other. An axis of the mounting hole and an axis of the threaded hole may be perpendicular to the extension direction of the first inner shaft 110. For example, in the embodiment shown in FIGS. 5-6, the axis of the mounting hole and the axis of the threaded hole may be parallel to the Z-axis direction. The threaded fastener 141 may pass through the mounting hole and be fixed in the threaded hole to implement a fixed connection between the first pusher 111 and the first inner shaft 110. In a possible case, the axis of the mounting hole and the axis of the threaded hole may be arranged coaxially.

In the embodiment shown in FIG. 6, the mounting hole of the first pusher 111 may be a stepped hole 1. The mounting hole may include a counter bore 1 with a larger inner diameter and a through hole 1 with a smaller inner diameter, where the through hole 1 is located on a side of the counter bore 1 close to the first inner shaft 110. A stepped hole 2 may be provided in the first inner shaft 110, the stepped hole 2 may include a counter bore 2 with a larger inner diameter and the above threaded hole, where the inner diameter of the threaded hole may be smaller than the inner diameter of the counter bore 2, the inner diameter of the counter bore 2 may be the same as the inner diameter of the through hole 1, and the counter bore 2 may be located on a side of the threaded hole close to the first pusher 111.

The winding device 10 may further include a bushing 142, where an outer diameter of the bushing 142 may be matched with the inner diameters of the counter bore 2 and the through hole 1, and the bushing 142 may be connected between the counter bore 2 and the through hole 1. The bushing 142 may further include a through hole 2, where an axis of the through hole 2 may be arranged in parallel with the axis of the threaded hole. The threaded fastener 141 may pass through the counter bore 1 of the first pusher 111 and the through hole 2 of the bushing 142, and be fixed in the threaded hole of the first inner shaft 110.

The provision of the bushing 142 is conducive to maintaining an orientation of the threaded fastener 141 relative to the first inner shaft 110 substantially constant, to decreasing the amount of shake of the first pusher 111 relative to the first inner shaft 110 and to improving the activation of the first pusher 111, and is thus conducive to precisely adjusting the distance between the first inner shaft 110 and the second inner shaft 120.

In the embodiment shown in FIG. 6, a plurality of threaded fasteners 141 may be provided. For example, the plurality of threaded fasteners 141 may be arranged on two sides of the first pusher 111. That is to say, the two sides of the first pusher 111 may be fixedly connected to two sides of the first inner shaft 110 by means of two threaded fasteners 141 respectively.

In other embodiments provided in the present application, the first pusher 111 and the first inner shaft 110 may also be fixedly connected in other manners, such as adhesion, welding, riveting, interference fit, etc.

Optionally, the inner shaft holder 131 includes a locking opening 134, where the locking opening 134 is arranged opposite to the threaded fastener 141, and the cover plate 191 covers the locking opening 134.

As shown in FIGS. 3, 5, and 6, in order to facilitate locking of the threaded fastener 141 from outside the inner shaft holder 131 to the first inner shaft 110, the inner shaft holder 131 may include the locking opening 134, and the locking opening 134 is arranged opposite to the threaded fastener 141. Since the first pusher 111 may be arranged in the inner shaft holder 131 to slide relative to the inner shaft holder 131, particulates generated by the sliding of the first pusher 111 relative to the inner shaft holder 131 may flow out through the locking opening 134. As shown in FIG. 4, by covering the cover plate 191 on the locking opening 134, it is conducive to decreasing the amount of the particulates passing through the locking opening 134.

In the embodiments provided by the present application, the second pusher 114 and the first outer shaft 130 may be fixedly connected by means of the threaded fastener, adhesion, welding, riveting, interference fit, etc.

Optionally, the winding device 10 may further include a first adjustment rod 151, where the first adjustment rod 151 may be arranged parallelly relative to the first direction, the first adjustment rod 151 is fixedly connected to the first slider 112, and the first adjustment rod 151 may be configured to reciprocate in the first direction so as to drive the first slider 112 to reciprocate in the first direction.

Optionally, the winding device 10 may further include a second adjustment rod 152, where the second adjustment rod 152 may be arranged parallelly relative to the third direction, the second adjustment rod 152 is fixedly connected to the second slider 115, and the second adjustment rod 152 is configured to reciprocate in the third direction so as to drive the second slider 115 to reciprocate in the third direction.

Figure 7:
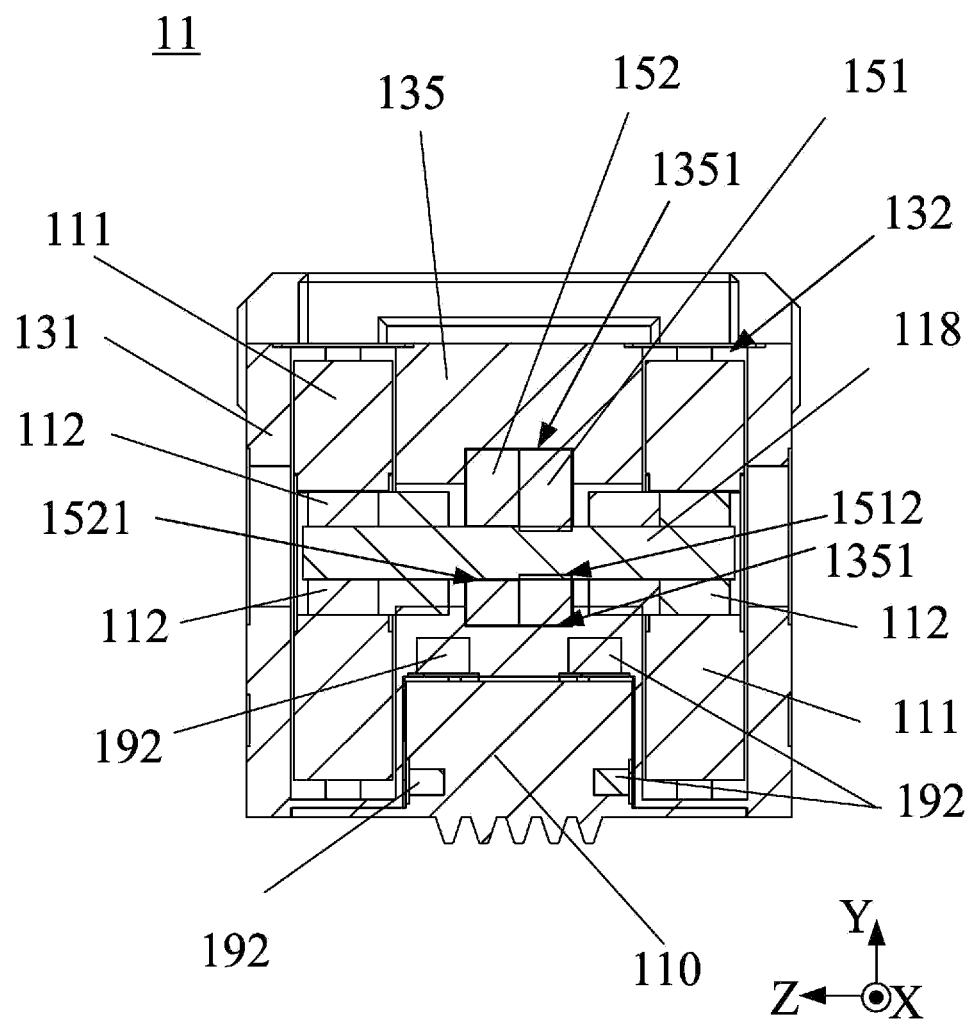
FIG. 7 is a cross-sectional view along plane B-B of the first inner shaft assembly in FIG. 5.
Figure 8:
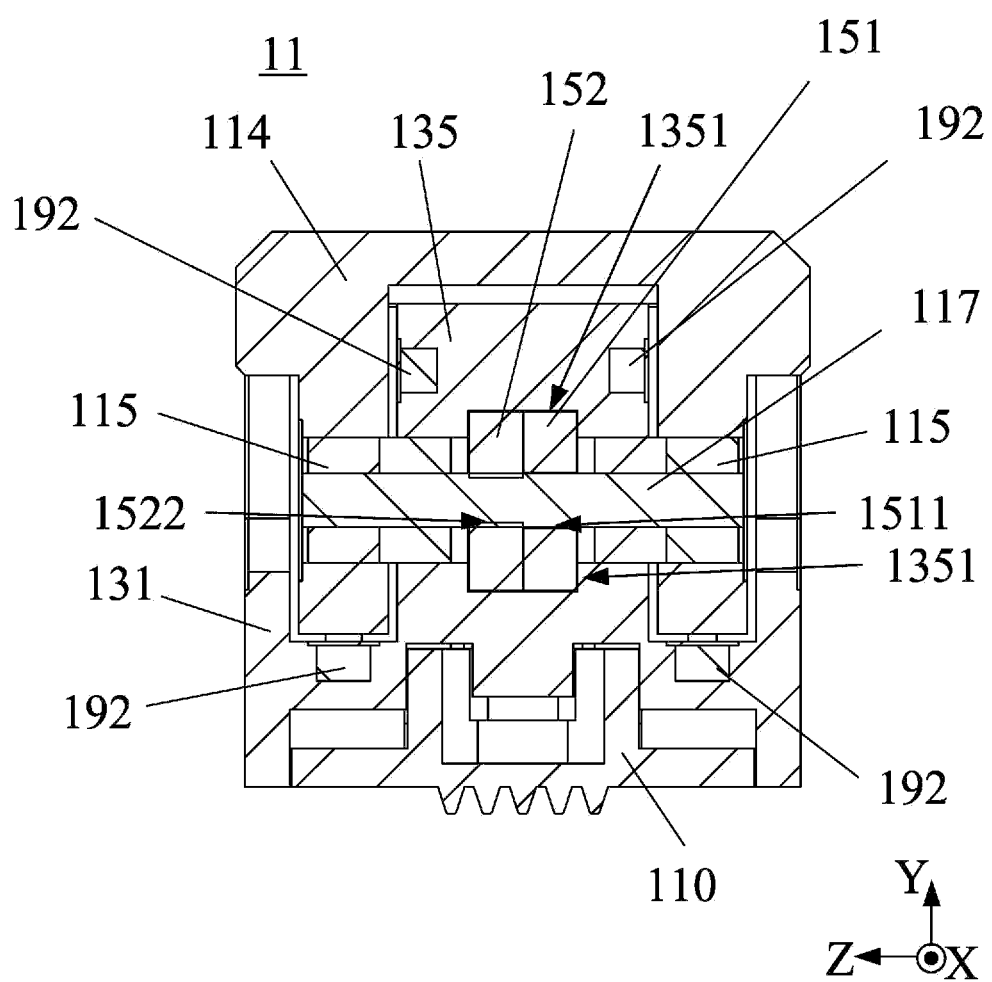
FIG. 8 is a cross-sectional view along plane C-C of the first inner shaft assembly in FIG. 5.
Figure 9:
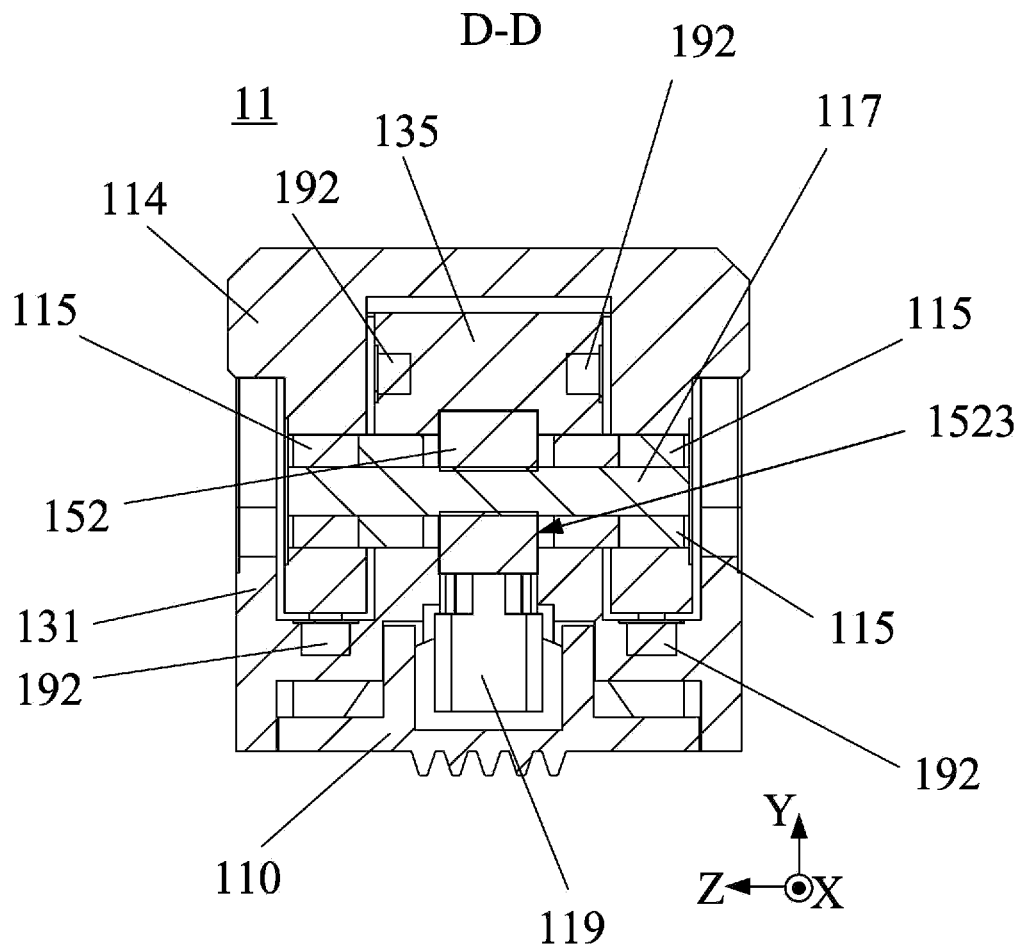
FIG. 9 is a cross-sectional view along plane D-D of the first inner shaft assembly in FIG. 5.
Figure 10:
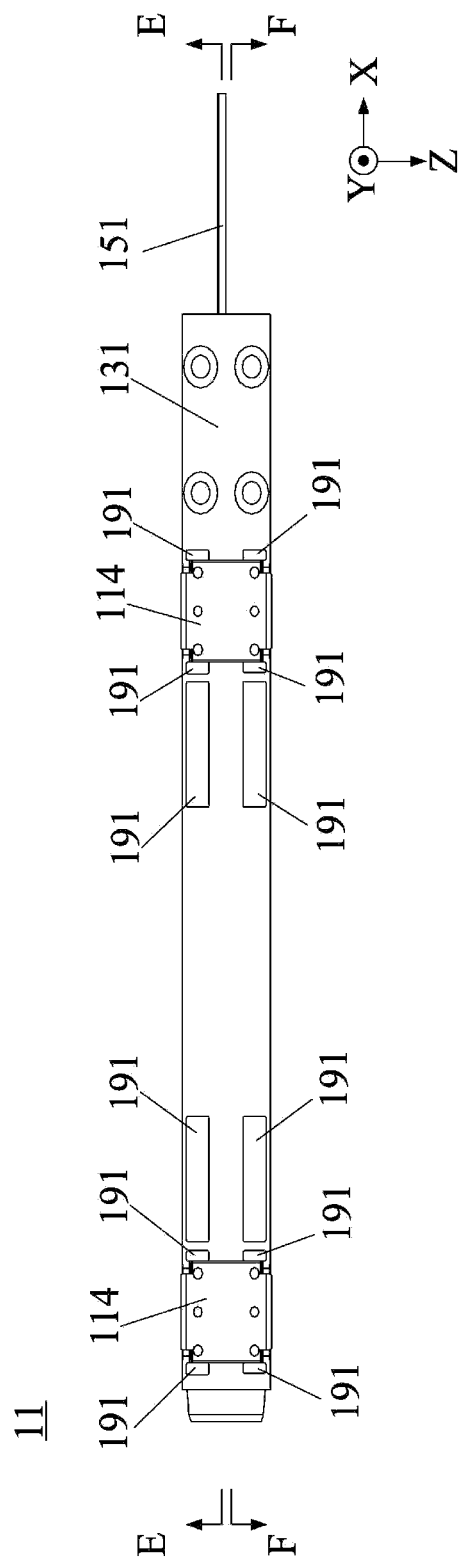
FIG. 10 is a schematic structural diagram of a first inner shaft assembly according to an embodiment of the present application.
Figure 11:
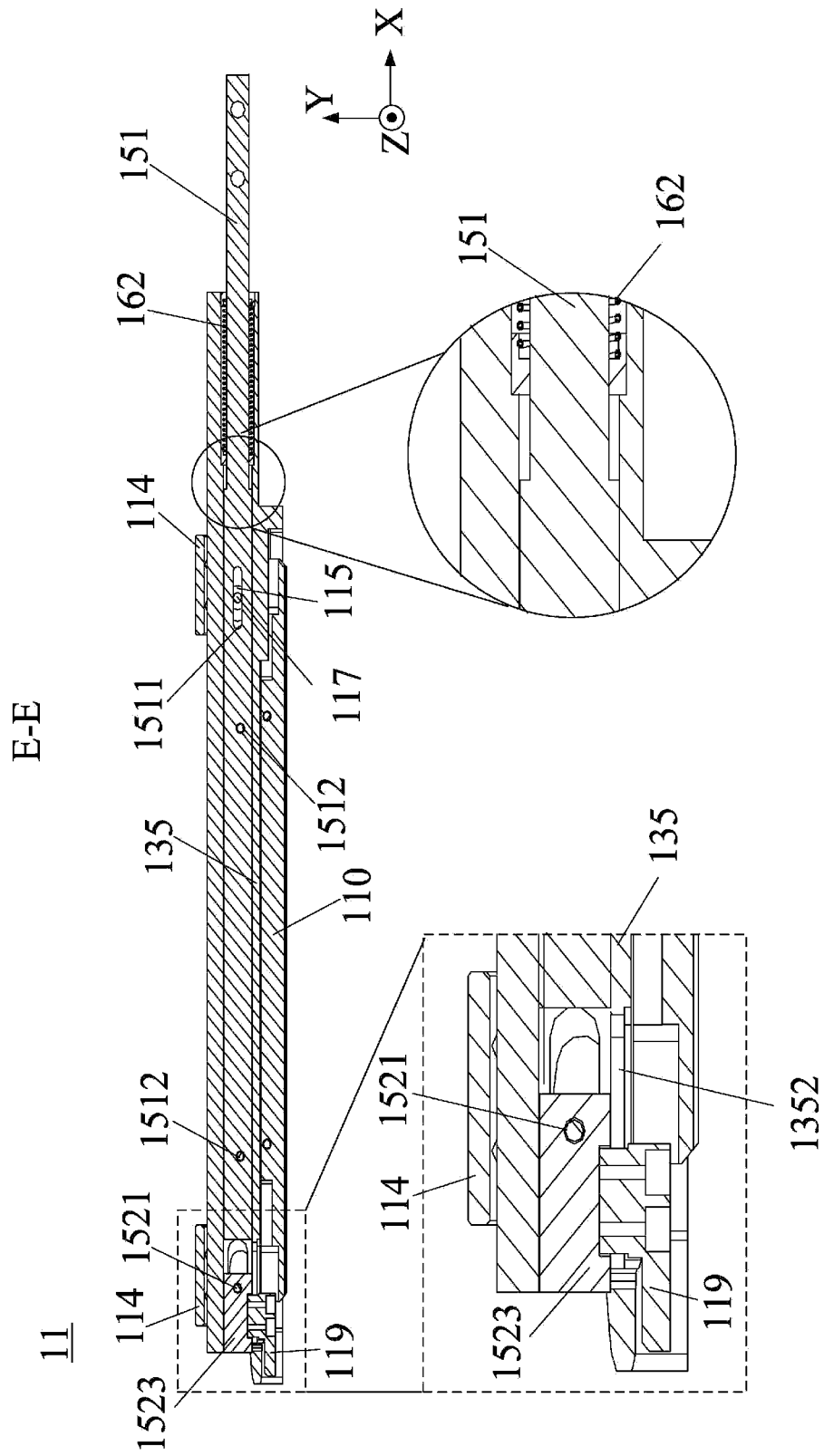
FIG. 11 is a cross-sectional view along plane E-E of the first inner shaft assembly in FIG. 10.
Figure 12:
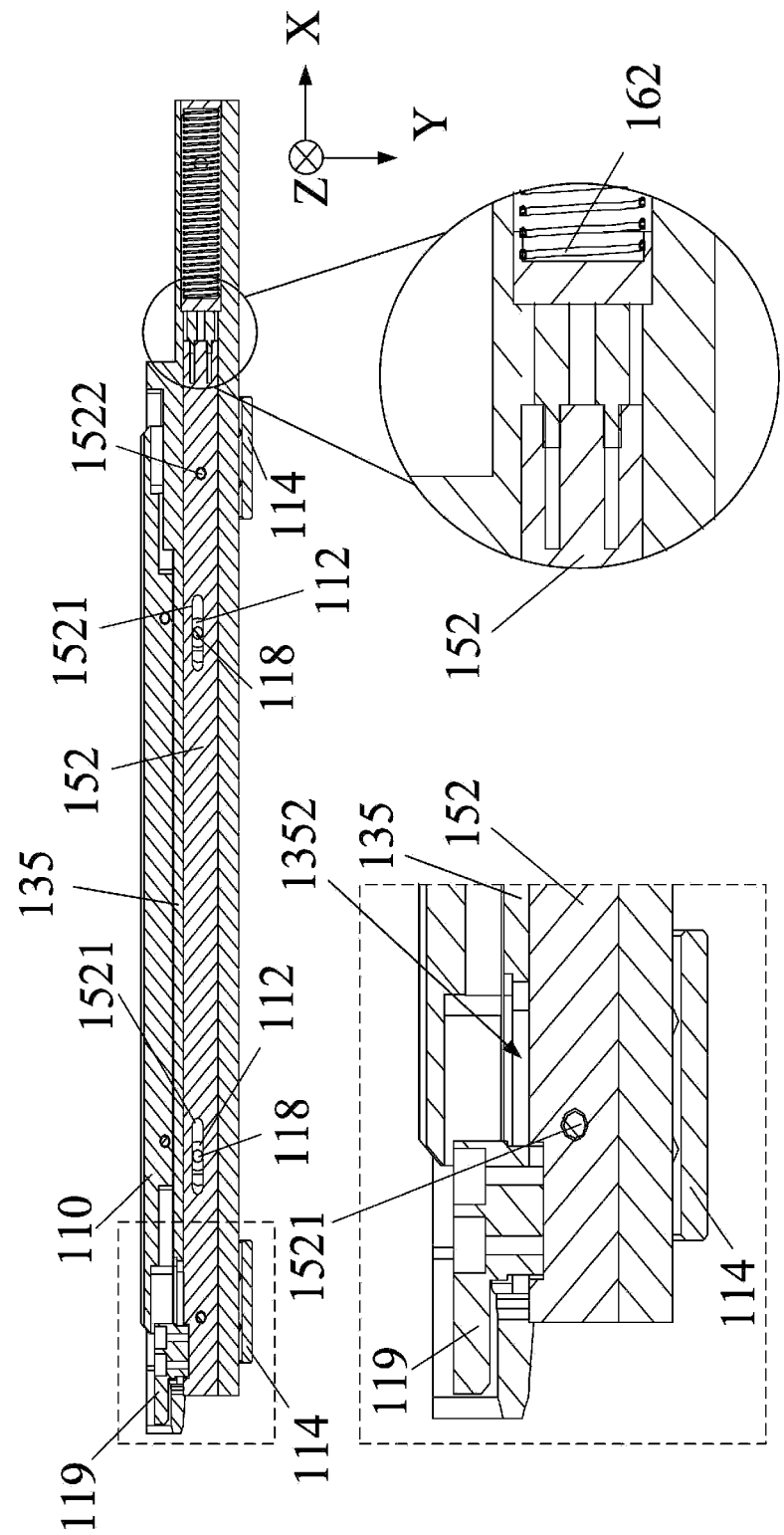
FIG. 12 is a cross-sectional view along plane F-F of the first inner shaft assembly in FIG. 10.

FIG. 7 illustrates a cross-sectional view along plane B-B in FIG. 5. FIG. 8 illustrates a cross-sectional view along plane C-C in FIG. 5. FIG. 9 illustrates a cross-sectional view along plane D-D in FIG. 5. FIG. 10 illustrates a schematic structural diagram of the first inner shaft assembly 11 from a viewing angle in the Y− direction shown in FIG. 5. FIG. 11 illustrates a cross-sectional view along plane E-E in FIG. 10. The section E-E may cut through the first adjustment rod 151. FIG. 12 illustrates a cross-sectional view along plane F-F in FIG. 10. The section F-F may be through the second adjustment rod 152.

With respect to the embodiments shown in FIGS. 5-12, the first adjustment rod 151 and the second adjustment rod 152 may be arranged side by side. An arrangement direction of the first adjustment rod 151 and the second adjustment rod 152 may be, for example, parallel to the Z-axis direction.

Optionally, the winding device 10 further includes a support portion 135, where the support portion 135 is housed in the inner shaft holder 131, the support portion 135 is provided with movement grooves 1351 for the first adjustment rod 151 and the second adjustment rod 152. In some embodiments provided in the present application, the support portion 135 may be, for example, a part of the inner shaft holder 131.

As shown in FIGS. 6-9, the support portion 135 may be arranged in an inner cavity of the first pusher 111, that is to say, the first pusher 111 may be used to bear the support portion 135. As shown in FIG. 6, a side of the support portion 135 away from the first outer shaft 130 may be arranged in contact with or opposite to the side of the first inner shaft 110 close to the first outer shaft 130. The extension direction of the support portion 135 may be parallel to the X-axis direction. The support portion 135 may have a through groove extending in the X-axis direction, and the first adjustment rod 151 and the second adjustment rod 152 run throughout the through groove. An inner diameter of the through groove in the Y-axis direction may be matched with the outer diameters of the first adjustment rod 151 and the second adjustment rod 152 in the Y-axis direction. The provision of the movement grooves 1351 in the support portion 135 is conducive to restricting the movements of the first adjustment rod 151 and the second adjustment rod 152 in the X-axis direction and to decreasing the displacements of the first adjustment rod 151 and the second adjustment rod 152 deviating from the X-axis direction.

The support portion 135 may have a through hole 1 in the Z-axis direction at a position opposite to the first slider 112, and a connector between the first adjustment rod 151 and the first slider 112 may pass through the through hole 1 of the support portion 135. The support portion 135 may have a through hole 2 in the Z-axis direction at a position opposite to the second slider 115, and a connector between the second adjustment rod 152 and the second slider 115 may pass through the through hole 2 of the support portion 135.

As shown in FIG. 8, the second pusher 114 may be arranged, for example, on a side of the support portion 135 away from the first inner shaft 110. A gap may be provided between the second pusher 114 and the support portion 135, and is conducive to reducing the possibility of the second pusher 114 hitting the support portion 135 during reciprocation in the fourth direction.

With respect to FIGS. 2 and 5, the winding apparatus or winding device 10 may include a first driving rod 230 and a second driving rod 240. The first driving rod 230 and the second driving rod 240 may be components of the driving device of the winding apparatus or winding device 10. In some embodiments, at least one of the first driving rod 230 and the second driving rod 240 may be a component of the winding device 10. In other embodiments, at least one of the first driving rod 230 and the second driving rod 240 may be a component of the winding apparatus except the winding device 10.

Optionally, the winding device 10 further includes: a first driving rod 230, the first driving rod 230 being configured to apply a driving force to the first adjustment rod 151 in the first direction; and a second driving rod 240, the second driving rod 240 being configured to apply a driving force to the second adjustment rod 152 in the third direction; where the first driving rod 230 and the second driving rod 240 are located at two sides of the inner shaft holder 131.

The first driving rod 230 may apply a force to the first adjustment rod 151 outside the first inner shaft assembly 11 such that the first adjustment rod 151 can move in the first direction. The second driving rod 240 may apply a force to the second adjustment rod 152 outside the first inner shaft assembly 11 such that the second adjustment rod 152 can move in the third direction.

In the embodiment shown in FIG. 2, the first driving rod 230 and the second driving rod 240 may be respectively located on two sides of the first inner shaft assembly 11. In other possible embodiments, the first driving rod 230 and the second driving rod 240 may be located on the same side of the first inner shaft assembly 11. That is to say, the first driving rod 230 and the second driving rod 240 may apply a driving force to the first adjustment rod 151 and the second adjustment rod 152 on the same side of the first inner shaft assembly 11.

In the embodiment shown in FIGS. 2-12, when the first driving rod 230 pulls the first adjustment rod 151 in a direction away from the first inner shaft assembly 11, the first adjustment rod 151 can move in the X+ direction (the first direction). Since the first adjustment rod 151 is fixedly connected to the first slider 112, the first slider 112 can move in the X+ direction to force the first pusher 111 to move in the Y− direction (the second direction), thereby decreasing the distance between the first inner shaft 110 and the second inner shaft 120 to clamp the electrode assembly 20. Correspondingly, when the first adjustment rod 151 moves in the X− direction (opposite to the first direction), the first slider 112 can force the first pusher 111 to move in the Y+ direction (opposite to the second direction), thereby increasing the distance between the first inner shaft 110 and the second inner shaft 120 to release the electrode assembly 20.

In another embodiment, the extension direction of the first sliding slot 113 may be different from the extension direction of the first sliding slot 113 shown in FIG. 5. The extension direction of the first sliding slot 113 may have a first component parallel to the X− axis and a second component parallel to the Y-axis, where the first component may be co-directional with the X− direction and the second component may be co-directional with the Y+ direction. Alternatively, the first component may be co-directional with the X+ direction and the second component may be co-directional with the Y− direction. Therefore, when the first driving rod 230 pushes the first adjustment rod 151 in a direction close to the first inner shaft assembly 11, the first adjustment rod 151 can move in the X− direction (the first direction) such that the first slider 112 can force the first pusher 111 to move in the Y− direction (the second direction), thereby decreasing the distance between the first inner shaft 110 and the second inner shaft 120 to clamp the electrode assembly 20. Correspondingly, when the first adjustment rod 151 moves in the X+ direction (opposite to the first direction), the first slider 112 can force the first pusher 111 to move in the Y+ direction (opposite to the second direction), thereby increasing the distance between the first inner shaft 110 and the second inner shaft 120 to release the electrode assembly 20.

In conclusion, a driving direction of the first slider 112, namely, a specific orientation of the first direction, may be optional.

In the embodiments shown in FIGS. 2-12, when the second driving rod 240 pushes the second adjustment rod 152 in a direction close to the first inner shaft assembly 11, the second adjustment rod 152 can move in the X+ direction (the third direction). Since the second adjustment rod 152 is fixedly connected to the second slider 115, the second slider 115 can move in the X+ direction such that the second slider 115 can force the second pusher 114 to move in the Y+ direction (the fourth direction), thereby increasing the distance between the first outer shaft 130 and the second outer shaft 140 for contact with and bearing the electrode assembly 20. Correspondingly, when the second adjustment rod 152 moves in the X− direction (opposite to the third direction), the second slider 115 can force the second pusher 114 to move in the Y− direction (opposite to the fourth direction), thereby decreasing the distance between the first outer shaft 130 and the second outer shaft 140 to get out of contact with the electrode assembly 20.

In other possible embodiments, the extension direction of the second sliding slot 116 may be different from the extension direction shown in FIG. 5. The extension direction of the second sliding slot 116 may have a third component parallel to the X-axis and a fourth component parallel to the Y-axis, where the third component may be co-directional with the X− direction and the fourth component may be co-directional with the Y− direction. Alternatively, the third component may be co-directional with the X+ direction and the fourth component may be co-directional with the Y+ direction. Therefore, when the second driving rod 240 pulls the second adjustment rod 152 in a direction away from the first inner shaft assembly 11, the second adjustment rod 152 can move in the X− direction (the third direction) such that the first slider 112 can force the second pusher 114 to move in the Y+ direction (the fourth direction), thereby increasing the distance between the first outer shaft 130 and the second outer shaft 140 for contact with and bearing the electrode assembly 20. Correspondingly, when the second adjustment rod 152 moves in the X+ direction (opposite to the third direction), the second slider 115 can force the second pusher 114 to move in the Y− direction (opposite to the fourth direction), thereby decreasing the distance between the first outer shaft 130 and the second outer shaft 140 to get out of contact with the electrode assembly 20.

In conclusion, a driving direction of the second slider 115, namely, a specific orientation of the third direction, may be optional.

Also, since the outer shaft and the inner shaft are separately controllable in the embodiments provided by the present application, the first direction may be the same as or different from the third direction. Optionally, the first direction is the same as the third direction, in the first direction, the first sliding slot 113 extends away from the second inner shaft 120, and the second sliding slot 116 extends close to the second inner shaft 120.

In some embodiments provided by the present application, the first pusher 111 may have a plurality of first sliding slots 113, where the plurality of first sliding slots 113 may be uniformly distributed in the first inner shaft assembly 11. The winding device 10 may further include a plurality of first sliders 112, where the plurality of first sliders 112 may in one-to-one correspondence with the plurality of first sliding slots 113, and each first slider 112 is movable in a corresponding first sliding slot 113. the extension directions of the plurality of first sliding slots 113 may be parallel to each other.

In an embodiment shown in FIG. 5, two first sliding slots 113 may be respectively located on two sides of the first inner shaft assembly 11 in the X-axis direction. Referring to FIG. 2, one of the two first sliding slots 113 may be located on a side of the first inner shaft assembly 11 close to the first driving rod 230, and the other one may be located on a side of the first inner shaft assembly 11 close to the second driving rod 240.

In an embodiment shown in FIG. 7, two first sliding slots 113 may be located on two sides of the first inner shaft assembly 11 in the Z-axis direction. The two first sliding slots 113 may, for example, be symmetrically arranged with respect to a central axis of the first pusher 111.

When the first adjustment rod 151 moves in the first direction, the plurality of first sliding slots 113 can be synchronously driven by the first adjustment rod 151, such that the plurality of first sliding slots 113 can move in the first direction, and thus the plurality of first sliding slots 113 can drive the first pusher 111 to move in the second direction. Therefore, it is conducive to reducing the possibility of excessive deflection of the first pusher 111 and the first adjustment rod 151 during movement by means of the plurality of first sliding slots 113 and the plurality of first sliding slots 113 that are symmetrically arranged and uniformly distributed. In the embodiment shown in FIG. 7, the first adjustment rod 151 may pass through the first pusher 111, and the first adjustment rod 151 may be arranged opposite to a central region of the first pusher 111.

In other embodiments provided by the present application, the second pusher 114 may have a plurality of second sliding slots 116, where the plurality of second sliding slots 116 may be uniformly distributed in the first inner shaft assembly 11. The winding device 10 may further include a plurality of second sliders 115, where the plurality of second sliders 115 may in one-to-one correspondence with the plurality of second sliding slots 116, and each second slider 115 is movable in a corresponding second sliding slot 1162. The extension directions of the plurality of second sliding slots 116 may be parallel to each other.

In an embodiment shown in FIG. 5, two second sliders 115 may be respectively located on two sides of the first inner shaft assembly 11 in the X-axis direction. Referring to FIG. 2, one of the two second sliders 115 may be located on a side of the first inner shaft assembly 11 close to the first driving rod 230, and the other one may be located on a side of the first inner shaft assembly 11 close to the second driving rod 240.

In an embodiment shown in FIG. 8, two second sliders 115 may be located on two sides of the first inner shaft assembly 11 in the Z-axis direction. The two second sliding slots 116 may, for example, be symmetrically arranged with respect to a central axis of the second pusher 114.

When the second adjustment rod 152 moves in the third direction, the plurality of second sliders 115 may be synchronously driven by the second adjustment rod 152 such that the plurality of second sliders 115 can move in the fourth direction, and thus the plurality of second sliders 115 can drive the second pusher 114 to move in the fourth direction. Therefore, it may be conducive to reducing the possibility of excessive deflection of the second pusher 114 and the second adjustment rod 152 during movement by means of the plurality of second sliders 115 and the plurality of second sliding slots 116 that are symmetrically arranged and uniformly distributed. In the embodiment shown in FIG. 8, the second adjustment rod 152 may pass through the second pusher 114, and the second adjustment rod 152 may be arranged opposite to a central region of the second pusher 114.

Optionally, the second adjustment rod 152 and the second slider 115 are fixedly connected by means of a first connecting shaft 117, the first adjustment rod 151 includes a first adjustment rod through hole 1511, and the first connecting shaft 117 runs through the first adjustment rod through hole 1511 and can reciprocate in the first adjustment rod through hole 1511 in the third direction.

Referring to FIG. 8, the winding device 10 may further include the first connecting shaft 117, the second adjustment rod 152 may further include a third adjustment rod through hole 1522, and the first connecting shaft 117 may be fixed in the third adjustment rod through hole 1522 so as to fixedly connect the first connecting shaft 117 to the second adjustment rod 152. A side of the first connecting shaft 117 away from the second adjustment rod 152 may be fixed to the second slider 115 so as to fixedly connect the second adjustment rod 152 to the second slider 115. That is to say, the first connecting shaft 117 may be fixedly connected between the second adjustment rod 152 and the second slider 115.

In some embodiments, an inner diameter of the third adjustment rod through hole 1522 may be matched with an outer diameter of the first connecting shaft 117 (that is, the inner diameter of the third adjustment rod through hole 1522 may be the same or approximately the same as the outer diameter of the first connecting shaft 117). In an embodiment, the first connecting shaft 117 may have an interference fit with the third adjustment rod through hole 1522 such that the first connecting shaft 117 may be fixed in the third adjustment rod through hole 1522. In another embodiment, the first connecting shaft 117 may be fixed in the third adjustment rod through hole 1522 by means of, for example, adhesion, welding, etc.

In an embodiment provided by the present application, with respect to FIGS. 2 and 5, the second slider 115 may be located between the first slider 112 and the first driving rod 230 for driving the first slider 112. The first adjustment rod 151 may extend from the first slider 112 to the first driving rod 230 and pass by the first connecting shaft 117 fixedly connected to the second slider 115. In order to enable the first slider 112 and the second slider 115 to move separately, the first adjustment rod 151 may be provided with the first adjustment rod through hole 1511 in which the first connecting shaft 117 can move, such that the first connecting shaft 117 and the second slider 115 can reciprocate together in the third direction relative to the first adjustment rod 151, thereby facilitating disengagement of the second slider 115 from a linkage relationship with the first adjustment rod 151.

In some embodiments, in order to reduce the friction between the first connecting shaft 117 and the first adjustment rod through hole 1511, an inner diameter of the first adjustment rod through hole 1511 may be greater than an outer diameter of the first connecting shaft 117 in a direction perpendicular to the first connecting shaft 117 (corresponding to the Y-axis direction).

The first adjustment rod through hole 1511 may further form a movement track for the first connecting shaft 117. The first adjustment rod through hole 1511 may be conducive to limiting a displacement component of the first connecting shaft 117 in the Y- axis direction, that is to say, the first adjustment rod through hole 1511 may be conducive to reducing the amount of offset of a movement direction of the second slider 115 from the X- axis direction.

Optionally, the size of the first adjustment rod through hole 1511 in the third direction is greater than or equal to a movement stroke of the second slider 115 in the third direction.

As shown in FIG. 8, the third direction may be parallel to the X-axis direction. The second slider 115 typically may not move endlessly in the third direction or a direction opposite to the third direction, and therefore, a maximum distance by which the second slider 115 moves in the third direction may be the movement stroke of the second slider 115 in the third direction. The size of the first adjustment rod through hole 1511 in the third direction is greater than the movement stroke of the second slider 115 in the third direction, which is conducive to preventing the first adjustment rod through hole 1511 from blocking the reciprocation of the first connecting shaft 117 together with the second slider 115 in the third direction.

Optionally, the first adjustment rod 151 and the first slider 112 are fixedly connected by means of a second connecting shaft 118, and the second adjustment rod 152 includes a second adjustment rod through hole 1521, and the second connecting shaft 118 runs through the second adjustment rod through hole 1521 and can reciprocate in the second adjustment rod through hole 1521 in the first direction.

Referring to FIG. 7, the winding device 10 may further include the second connecting shaft 118, the first adjustment rod 151 may further include a fourth adjustment rod through hole 1512, and the second connecting shaft 118 may be fixed in the fourth adjustment rod through hole 1512 so as to fixedly connect the second connecting shaft 118 to the first adjustment rod 151. A side of the second connecting shaft 118 away from the first adjustment rod 151 may be fixed to the first slider 112 so as to fixedly connect the first adjustment rod 151 to the first slider 112. That is to say, the second connecting shaft 118 may be fixedly connected between the first adjustment rod 151 and the first slider 112.

In some embodiments, an inner diameter of the fourth adjustment rod through hole 1512 may be matched with an outer diameter of the second connecting shaft 118. In an embodiment, the second connecting shaft 118 may be fixed in the fourth adjustment rod through hole 1512 by means of interference fit, adhesion, welding, etc. with the fourth adjustment rod through hole 1512.

In an embodiment provided by the present application, with respect to FIGS. 2 and 5, the first slider 112 may be located between the second slider 115 and the second driving rod 240 for driving the second slider 115. The second adjustment rod 152 may extend from the second slider 115 to the second driving rod 240 and pass by the second connecting shaft 118 fixedly connected to the first slider 112. In order to enable the first slider 112 and the second slider 115 to move separately, the second adjustment rod 152 may be provided with the second adjustment rod through hole 1521 in which the second connecting shaft 118 can move, such that the second connecting shaft 118 and the first slider 112 can reciprocate together in the first direction relative to the second adjustment rod 152, thereby facilitating disengagement of the first slider 112 from a linkage relationship with the second adjustment rod 152.

In some embodiments, in order to reduce the friction between the second connecting shaft 118 and the second adjustment rod through hole 1521, the inner diameter of the second adjustment rod through hole 1521 may be greater than the outer diameter of the second connecting shaft 118 in a direction perpendicular to the second connecting shaft 118 (corresponding to the Y-axis direction).

The second adjustment rod through hole 1521 may further form a movement track for the second connecting shaft 118. The first adjustment rod through hole 1521 may be conducive to limiting a displacement component of the second connecting shaft 118 in the Y-axis direction, that is to say, the second adjustment rod through hole 1521 may be conducive to reducing the amount of offset of a movement direction of the first slider 112 from the X-axis direction.

Optionally, the size of the second adjustment rod through hole 1521 in the first direction is greater than or equal to a movement stroke of the first slider 112 in the first direction.

The first slider 112 typically may not move endlessly in the first direction or a direction opposite to the first direction, and therefore, a maximum distance by which the first slider 112 moves in the first direction may be the movement stroke of the first slider 112 in the first direction. The size of the second adjustment rod through hole 1521 in the first direction is greater than the movement stroke of the first slider 112 in the first direction, which is conducive to preventing the second adjustment rod through hole 1521 from blocking the reciprocation of the second connecting shaft 118 together with the first slider 112 in the first direction.

Optionally, one end of the second adjustment rod 152 is provided with an adjustment rod protrusion 1523, and the adjustment rod protrusion 1523 protrudes toward the first adjustment rod 151 in a direction perpendicular to the first direction.

With respect to FIGS. 2, 5, and 8 to 12, the first adjustment rod 151 and the second adjustment rod 152 may correspond to a central region of the inner shaft holder 131, where the first adjustment rod 151 may be located at one side of a centerline of the inner shaft holder 131, and the inner shaft holder 131 may be located at the other side of the centerline of the first pusher 111. At a side close to the second driving rod 240, a distance between the second adjustment rod 152 and the second driving rod 240 may be smaller than a distance between the first adjustment rod 151 and the second driving rod 240, that is to say, a second orthographic projection of the second adjustment rod 152 in the Z-axis direction may extend from a first orthographic projection of the first adjustment rod 151 in the Z-axis direction to the X− direction. Therefore, the adjustment rod protrusion 1523 is arranged at a portion of the second adjustment rod 152 not corresponding to the first orthographic projection, and the adjustment rod protrusion 1523 may protrude toward the first adjustment rod 151, such that the portion of the second adjustment rod 152 not corresponding to the first orthographic projection may correspond to a central region of the first pusher 111, which is conducive to reducing the possibility of offset of the second adjustment rod 152 relative to the X-axis direction during the movement.

Optionally, the winding device 10 further includes: a first elastic element 161, the first elastic element 161 being configured to apply a driving force in a direction opposite to the first direction, to the first adjustment rod 151.

The first driving rod 230 may apply a driving force in the first direction to the first adjustment rod 151 such that the first adjustment rod 151 can move in the first direction, for example, a movement from position A to position A'. During the movement of the first adjustment rod 151 from position A to position A', the first elastic element 161 may be gradually elongated or compressed. After the force of the first driving rod 230 acting on the first adjustment rod 151 in the first direction is removed or reduced, due to an elastic restoring force (the direction of the restoring force may be opposite to the first direction) of the first elastic element 161 itself, the first driving rod 230 can return to its initial position, namely, from position A' to position A, under the drive of the first elastic element 161, so as to facilitate a winding process for a next batch.

Optionally, the winding device 10 further includes: a winding shaft seat, the winding shaft seat having a winding shaft seat cavity 211 with an opening facing the inner shaft holder 131, where the first adjustment rod 151 extends into the winding shaft seat cavity 211, and the first elastic element 161 abuts against a bottom wall of the winding shaft seat cavity 211.

Figure 13:
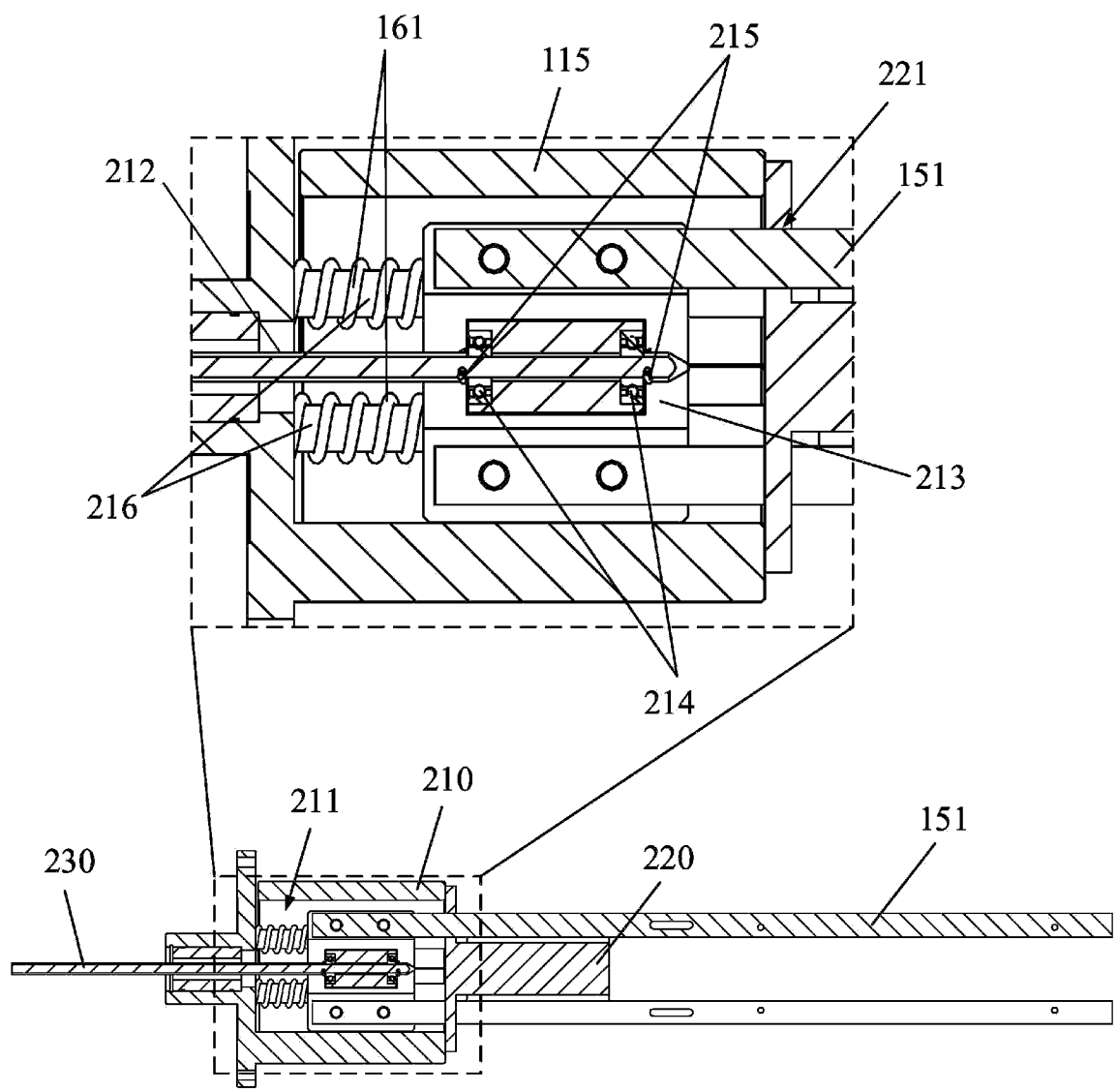
FIG. 13 is a cross-sectional view illustrating a winding shaft seat and a connecting seat according to an embodiment of the present application.

FIG. 13 illustrates a schematic structural diagram of a winding shaft seat cavity 211 according to an embodiment of the present application. With respect to FIGS. 2 and 13, the winding device 10 may include the winding shaft seat cavity 211, where the winding shaft seat cavity 211 may be located between the first driving rod 230 and the first inner shaft assembly 11. The first adjustment rod 151 may extend from the first inner shaft assembly 11 and into the winding shaft seat cavity 211. One end of the first elastic element 161 may abut against the bottom wall of the winding shaft seat cavity 211, and the other end of the first elastic element 161 may be used to apply a force to the first adjustment rod 151.

In an embodiment, after the first adjustment rod 151 moves in a direction away from the winding shaft seat cavity 211, the first elastic element 161 may be in a stretched state, such that the first elastic element 161 may be used to pull the first adjustment rod 151 to move in a direction close to the winding shaft seat cavity 211. In another embodiment, after the first adjustment rod 151 moves in a direction close to the winding shaft seat cavity 211, the first elastic element 161 may be in a compressed state, and the first elastic element 161 may be used to push the first adjustment rod 151 to move in a direction away from the winding shaft seat cavity 211.

Optionally, a winding shaft seat through hole 212 is provided in the bottom wall of the winding shaft seat cavity 211, and the first driving rod 230 runs through the winding shaft seat through hole 212 and extends into the winding shaft seat cavity 211. The winding device 10 further includes a drive slider 213, where the drive slider 213 is housed inside the winding shaft seat cavity 211, the drive slider 213 is fixedly connected to the first adjustment rod 151 and is fixed relative to the first driving rod 230 in the first direction, and the first elastic element 161 abuts between the drive slider 213 and the winding shaft seat cavity 211.

The first driving rod 230 may run through the winding shaft seat through hole 212 and extend into the winding shaft seat cavity 211 from a side of the winding shaft seat cavity 211 away from the first inner shaft assembly 11. An end of the first driving rod 230 close to the first inner shaft assembly 11 may be connected to the drive slider 213 in the winding shaft seat cavity 211 in order to be fixed relative to the first driving rod 230 in the first direction. Therefore, the drive slider 213 may move in the first direction under the drive of the first driving rod 230.

One end of the first elastic element 161 is fixedly connected to the bottom wall of the winding shaft seat cavity 211, and the other end of the first elastic element 161 is fixedly connected to the drive slider 213. Therefore, the drive slider 213 may moved in a direction opposite to the first direction under the drive of the first elastic element 161.

Since the side of the first adjustment rod 151 away from the first inner shaft assembly 11 may be fixed to the drive slider 213, the drive slider 213 can drive the first adjustment rod 151 to reciprocate in the first direction. That is to say, the first driving rod 230 can drive the first adjustment rod 151 to move in the first direction by means of the drive slider 213, and the first elastic element 161 can drive the first adjustment rod 151 to move in the direction opposite to the first direction by means of the drive slider 213.

As shown in FIG. 13, a pin 215 may be built in the drive slider 213, and the pin 215 may be inserted into a hole of the first driving rod 230 to provide limiting and fixing, such that the first driving rod 230 is fixed relative to the first driving rod 230 in the first direction. In an embodiment, a plurality of pins 215 may be provided, and the plurality of pins 215 may be arranged in the first direction.

As shown in FIG. 13, a rolling bearing 214 may be built in the drive slider 213, an outer periphery of the rolling bearing 214 may be fixed to the drive slider 213, and an inner periphery of the rolling bearing 214 may be fixedly connected to the first driving rod 230. The outer periphery of the rolling bearing 214 and the inner periphery of the rolling bearing 214 are fixed relative to each other in the first direction. The outer periphery of the rolling bearing 214 may rotate relative to the inner periphery of the rolling bearing 214.

During the winding, the winding shaft seat cavity 211 may rotate relative to the first driving rod 230, but the first driving rod 230 may substantially not rotate. The provision of the rolling bearing 214 is conducive to reducing the amount of rotational friction between the first driving rod 230 and the drive slider 213. In an embodiment, a plurality of rolling bearings 214 may be provided, and the plurality of rolling bearings 214 may be arranged in the first direction.

As shown in FIG. 13, the bottom wall of the winding shaft seat cavity 211 may be further provided with a guide rail 216 for the drive slider 213, the first elastic element 161 may be sleeved on an outer periphery of the guide rail 216, and it is thus conducive to reducing the displacement of the drive slider 213 deviating from the first direction.

Optionally, the winding device 10 further includes a connecting seat 220, where the connecting seat 220 is located between the winding shaft seat cavity 211 and the inner shaft holder 131 and covers the opening of the winding shaft seat cavity 211, the connecting seat 220 includes a connecting seat through hole 221, and the first adjustment rod 151 runs through the connecting seat through hole 221.

As shown in FIG. 2, the winding device 10 may include the connecting seat 220, where the connecting seat 220 may be connected between the winding shaft seat cavity 211 and the first inner shaft assembly 11. As shown in FIG. 13, the connecting seat 220 may include a connecting cover plate and a connecting protrusion, where the connecting protrusion may protrude from the connecting cover plate toward the first inner shaft assembly 11. The connecting cover plate may cover the opening of the winding shaft seat cavity 211. The connecting seat through hole 221 may be provided in the connecting cover plate. The first adjustment rod 151 may extend from the first inner shaft assembly 11, runs through the connecting seat through hole 221, and extend into the winding shaft seat cavity 211 in order to be fixedly connected to the drive slider 213 in the winding shaft seat cavity 211.

Figure 14:
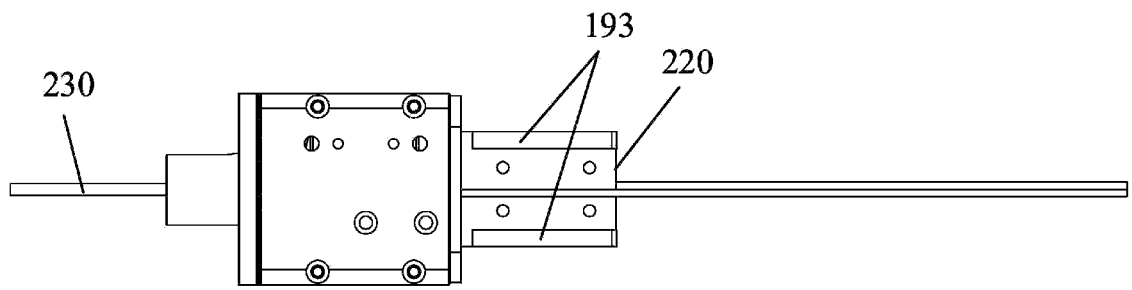
FIG. 14 is a schematic structural diagram illustrating a winding shaft seat and a connecting seat according to an embodiment of the present application.

FIG. 14 illustrates a schematic structural diagram of a connecting seat 220 according to the present application. In some embodiments provided in the present application, a cover plate 193 may be arranged on the connecting seat 220. The cover plate 193 may be used to prevent particulates in the connecting seat 220 and the first inner shaft assembly 11 from flowing out of the connecting seat 220.

Optionally, the winding device 10 further includes: a second elastic element 162, the second elastic element 162 being configured to apply a driving force in a direction opposite to the third direction, to the second adjustment rod 152.

The second driving rod 240 may apply a driving force to the second adjustment rod 152 in the third direction such that the second adjustment rod 152 can move in the third direction, for example, a movement from position B to position B'. During the movement of the second adjustment rod 152 from position B to position B', the second elastic element 162 may be gradually elongated or compressed. After the force of the second driving rod 240 acting on the second adjustment rod 152 is removed or reduced, due to an elastic restoring force (the direction of the restoring force may be opposite to the third direction) of the second elastic element 162 itself, the second driving rod 240 can return to its initial position, namely, from position B' to position B, under the drive of the second elastic element 162, so as to facilitate a winding process for a next batch.

Optionally, one end of the second elastic element 162 is fixed to the inner shaft holder 131, and the other end of the second elastic element 162 abuts against the second adjustment rod 152.

FIGS. 11 and 12 illustrate schematic structural diagrams of the second elastic element 162 in the first inner shaft assembly 11. The second adjustment rod 152 may move in the third direction under the drive of the second driving rod 240. One end of the second elastic element 162 is fixedly connected to the inner shaft holder 131, and the other end of the second elastic element 162 is fixedly connected to the second adjustment rod 152. Therefore, the second adjustment rod 152 may move in the direction opposite to the third direction under the drive of the second elastic element 162.

In an embodiment, in conjunction with FIGS. 12 and 13, an elastic element base is fixed to a side of the second elastic element 162 close to the winding shaft seat cavity 211. A side of the second elastic element 162 away from the second adjustment rod 152 may be fixed to the elastic element base to fixedly connect the second elastic element 162 to the inner shaft holder 131.

Optionally, the support portion 135 includes a support portion opening 1352, and the winding device 10 further includes a third pusher 119, where the third pusher 119 passes through the support portion opening 1352 and is fixedly connected to the second adjustment rod 152, the third pusher 119 is used to apply a driving force in the third direction to the second adjustment rod 152, and an inner diameter of the support portion opening 1352 in the third direction is greater than or equal to a stroke of the second adjustment rod 152 in the third direction.

As shown in FIGS. 11 and 12, the third pusher 119 may include a third pusher body and a third pusher protrusion, where the third pusher protrusion may extend from the third pusher body in a direction away from the second adjustment rod 152. An extension direction of the third pusher protrusion may be parallel to an extension direction of the second adjustment rod 152. An end of the third pusher protrusion away from the second adjustment rod 152 or the third pusher body may be configured for contact with the second driving rod 240. The third pusher body may pass through the support portion opening 1352 and be fixedly connected to the second adjustment rod 152. The third pusher body may be fixed to the second adjustment rod 152, for example, by means of threaded fasteners. When the third pusher 119 is driven by the second driving rod 240 to move in the third direction, the second adjustment rod 152 can correspondingly move in the third direction.

The support portion opening 1352 may be provided in a side of the second adjustment rod 152 in the Y-axis direction, that is to say, the support portion opening 1352 and the second adjustment rod 152 may be arranged in the Y-axis direction. An inner diameter of the support portion opening 1352 in the X-axis direction is greater than or equal to the stroke of the second adjustment rod 152 in the third direction such that the third pusher 119 can reciprocate in the support portion opening 1352 in the third direction.

In some embodiments, the third pusher 119 may move to an edge of the support portion opening 1352 farthest away from the winding shaft seat cavity 211, and therefore, the support portion opening 1352 can at least be used to limit a farthest stop position of the third pusher 119 in the X− direction.

In an embodiment, the support portion opening 1352 may also be used to limit the farthest stop position of the third pusher 119 in the X+ direction. That is to say, the support portion opening 1352 may be used to limit the maximum stroke of the third pusher 119 in the third direction.

In the embodiment shown in FIGS. 11 and 12, a holder protrusion may be arranged on the inner shaft holder 131, the holder protrusion may protrude from a body of the inner shaft holder 131 toward the support portion opening 1352, and a projection of the support portion opening 1352 in the Y-axis direction may be located in the support portion opening 1352. That is to say, after the third pusher 119 moves to the holder protrusion, there may be a gap between the third pusher 119 and the edge of the support portion opening 1352. In this embodiment, the holder protrusion may be used to limit the farthest stop position of the third pusher 119 in the X+ direction.

Optionally, the support portion 135 includes a support portion accommodating cavity, and the winding device 10 further includes a fourth pusher, where the fourth pusher passes through the support portion accommodating cavity and is fixedly connected to the second adjustment rod 152, the fourth pusher is used to apply a driving force in a direction opposite to the third direction, to the second adjustment rod 152, and an inner diameter of the support portion accommodating cavity in the third direction is greater than or equal to the stroke of the second adjustment rod 152 in the third direction.

As shown in FIG. 12, the fourth pusher may be partially accommodated in the support portion accommodating cavity, and the remaining portion may extend from the support portion accommodating cavity and be fixedly connected to the second adjustment rod 152. When the fourth pusher is driven to move in the direction opposite to the third direction, the second adjustment rod 152 may correspondingly move in the direction opposite to the third direction. In the embodiment shown in FIG. 12, the fourth pusher may be driven by a second elastic connector to move in the direction opposite to the third direction. The fourth pusher may be located between the second adjustment rod 152 and the second elastic element 162.

The inner diameter of the support portion accommodating cavity in the Y-axis direction may be matched with the maximum outer diameter of the fourth pusher in the Y− axis direction. The support portion accommodating cavity may have an opening on a side close to the second adjustment rod 152, and an inner diameter of the opening in the Y-axis direction may be smaller than the maximum outer diameter of the fourth pusher in the Y− axis direction, such that the fourth pusher cannot be completely moved out from the support portion accommodating cavity. The inner diameter of the support portion accommodating cavity in the X-axis direction may correspond to a distance between the fourth pusher and the elastic element seat, that is to say, the support portion accommodating cavity may be used to limit the maximum stroke of the fourth pusher or a side of the second elastic element 162 away from the winding shaft seat cavity 211. Specifically, the inner diameter of the support portion accommodating cavity in the third direction may be greater than or equal to the stroke of the second adjustment rod 152 in the third direction.

As shown in FIG. 11, the second elastic element 162 may surround an outer periphery of the first adjustment rod 151. Since the first adjustment rod 151 and the second adjustment rod 152 move independently, in order to prevent the first adjustment rod 151 from being driven during the movement of the second elastic element 162, the fourth pusher may have a pusher through hole, and the first adjustment rod 151 can run through the pusher through hole and can reciprocate in the pusher through hole in the first direction. In some embodiments, an inner diameter of the pusher through hole in the Y-axis direction is greater than or equal to an outer diameter of the first adjustment rod 151 in the Y-axis direction.

In the embodiments described above, the first holder cavity 132 of the inner shaft holder 131 may be used to house the first pusher 111. Optionally, the inner shaft holder 131 further includes a third sliding slot 136 in communication with the first holder cavity 132, where a body 1111 of the first pusher 111 is housed in the first holder cavity 132, the first pusher 111 further includes a first pusher protrusion 1112, the first pusher protrusion 1112 is slidable in the third sliding slot 136 in the second direction, and a sliding clearance between the first pusher protrusion 1112 and the third sliding slot 136 is smaller than a sliding clearance between the body 1111 of the first pusher 111 and the first holder cavity 132.

The third sliding slot 136 may be located on one side of the first holder cavity 132. The third sliding slot 136 extends in the second direction. As shown in FIG. 3, the third sliding slot 136 is arranged parallelly relative to the Y-axis direction and may be arranged with the first holder cavity 132 in the X-axis direction. The third sliding slot 136 may be in communication with the first holder cavity 132 to form a communicating cavity. The first pusher protrusion 1112 of the first pusher 111 may protrude from the body 1111 of the first pusher 111 and extend into the third sliding slot 136.

In the embodiment shown in FIG. 3, an inner diameter of the third sliding slot 136 in the Z-axis direction may be smaller than an inner diameter of the first holder cavity 132 in the Z-axis direction. The third sliding slot 136 may, for example, act as a guide rail for the first pusher 111, and a pushing portion of the first pusher 111 may, for example, act as a guide rail mating member of the first pusher 111.

The sliding clearance between the first pusher protrusion 1112 and the third sliding slot 136 may refer to a mean spacing distance between the first pusher protrusion 1112 and the third sliding slot 136. The sliding clearance between the body 1111 of the first pusher 111 and the first holder cavity 132 may refer to a mean spacing distance between the body 1111 of the first pusher 111 and the first holder cavity 132.

Since the sliding clearance between the first pusher protrusion 1112 and the third sliding slot 136 is smaller than the sliding clearance between the body 1111 of the first pusher 111 and the first holder cavity 132, the degree of sliding friction between the body 1111 of the first pusher 111 and the first holder cavity 132 may be smaller than the degree of sliding friction between the first pusher protrusion 1112 and the third sliding slot 136. Therefore, a main friction region of the first pusher 111 may be concentrated on the first pusher protrusion 1112, which is conducive to reducing the friction involved by the body 1111 of the first pusher 111. A contact area between the first pusher protrusion 1112 and the third sliding slot 136 is small, and therefore, the overall degree of friction between the first pusher protrusion 1112 and the third sliding slot 136 is small.

Optionally, the winding device 10 further includes a cover plate 191 covering an end of the first holder cavity 132 and/or the third sliding slot 136 close to the first outer shaft 130.

As shown in FIG. 3, the cover plate 191 covering the first holder cavity 132 further covers the third sliding slot 136. In another embodiment provided by the present application, the winding device 10 may be provided with only a cover plate 191 covering the third sliding slot 136. In still another embodiment provided by the present application, the winding device 10 may be separately provided with a cover plate 191 snap-fitted on the first holder cavity 132 and a cover plate 191 snap-fitted on the third sliding slot 136.

During winding, the first pusher 111 moves in the first holder cavity 132 and the third sliding slot 136, so sliding friction may occur between the first pusher 111 and the first holder cavity 132, and sliding friction may occur between the first pusher 111 and the third sliding slot 136, and particulates are thus generated. The particulates may fall onto the electrode assembly 20, and may thus puncture the electrode assembly 20, which in turn reduces the yield of the electrode assembly 20. By covering the cover plate 191 on the end of the first holder cavity 132 and/or the third sliding slot 136 close to the first outer shaft 130, it is conducive to reducing the possibility of the particulates falling out through a gap between the first pusher 111 and the first holder cavity 132 and/or between the first pusher 111 and the third sliding slot 136.

In the embodiments described above, the second holder cavity 133 of the inner shaft holder 131 may be used to house the second pusher 114. Optionally, the inner shaft holder 131 further includes a fourth sliding slot 137 in communication with the second holder cavity 133, where the body 1141 of the second pusher 114 is housed in the second holder cavity 133, the second pusher 114 further includes a second pusher protrusion 1142, the second pusher protrusion 1142 is slidable in the fourth sliding slot 137 in the fourth direction, and a sliding clearance between the second pusher protrusion 1142 and the fourth sliding slot 137 is smaller than a sliding clearance between the body 1141 of the second pusher 114 and the second holder cavity 133.

The fourth sliding slot 137 may be located on one side of the second holder cavity 133. The fourth sliding slot 137 extends in the fourth direction. As shown in FIG. 3, the fourth sliding slot 137 is arranged parallelly relative to the Y-axis direction and may be arranged with the second holder cavity 133 in the X-axis direction. The fourth sliding slot 137 may be in communication with the second holder cavity 133 to form a communicating cavity. A second pusher protrusion 1142 of the second pusher 114 may protrude from the body 1141 of the second pusher 114 and extend into the fourth sliding slot 137.

In the embodiment shown in FIG. 3, the inner diameter of the fourth sliding slot 137 in the Z-axis direction may be smaller than the inner diameter of the second holder cavity 133 in the Z-axis direction. The fourth sliding slot 137 may, for example, act as a guide rail for the second pusher 114, and a pushing portion of the second pusher 114 may, for example, act as a guide rail mating member of the second pusher 114.

The sliding clearance between the second pusher protrusion 1142 and the fourth sliding slot 137 may refer to a mean spacing distance between the second pusher protrusion 1142 and the fourth sliding slot 137. The sliding clearance between the body 1141 of the second pusher 114 and the second holder cavity 133 may refer to a mean spacing distance between the body 1141 of the second pusher 114 and the second holder cavity 133.

Since the sliding clearance between the second pusher protrusion 1142 and the fourth sliding slot 137 is smaller than the sliding clearance between the body 1141 of the second pusher 114 and the second holder cavity 133, the degree of sliding friction between the body 1141 of the second pusher 114 and the second holder cavity 133 may be smaller than the degree of sliding friction between the second pusher protrusion 1142 and the fourth sliding slot 137. Therefore, a main friction region of the second pusher 114 may be concentrated on the second pusher protrusion 1142, which is conducive to reducing the friction involved by the body 1141 of the second pusher 114. A contact area between the second pusher protrusion 1142 and the fourth sliding slot 137 is small, and therefore, the overall degree of friction between the second pusher protrusion 1142 and the fourth sliding slot 137 is small.

Optionally, the winding device 10 further includes a cover plate 191 covering an end of the fourth sliding slot 137 close to the first outer shaft 130.

During the winding, the second pusher protrusion 1142 moves in the fourth sliding slot 137, so sliding friction may occur between the second pusher protrusion 1142 and the fourth sliding slot 137, and particulates are thus generated. The particulates may fall onto the electrode assembly 20, and may thus puncture the electrode assembly 20, which in turn reduces the yield of the electrode assembly 20. By covering the cover plate 191 on the end of the fourth sliding slot 137 close to the first outer shaft 130, it is conducive to reducing the possibility of the particulates generated between the second pusher protrusion 1142 and the fourth sliding slot 137 falling out through the gap between the second pusher protrusion 1142 and the fourth sliding slot 137.

Optionally, the opening of the first sliding slot 113 away from the first slider 112 is covered by the cover plate 191; and/or the opening of the second sliding slot 116 away from the second slider 115 is covered by the cover plate 191; and/or the inner shaft holder 131 includes a first sliding slot opening 138, where the first sliding slot opening 138 is arranged opposite to the first sliding slot 113 in the first pusher 111, and a first slider 112 opening is covered by the cover plate 191; and/or the inner shaft holder 131 includes a second sliding slot opening 139, where the second sliding slot opening 139 is arranged opposite to the second sliding slot 116 in the second pusher 114, and a second slider 115 opening is covered by the cover plate 191.

With respect to FIGS. 3-9, particulates generated in the first pusher 111 may flow out through the first sliding slot 113. By covering the cover plate 191 on the opening of the first sliding slot 113 away from the first slider 112, it is conducive to reducing the amount of the particulates passing through the first sliding slot 113.

With respect to FIGS. 3-9, the particulates generated in the second pusher 114 may flow out through the second sliding slot 116. By covering the cover plate 191 on the opening of the second sliding slot 116 away from the second slider 115, it is conducive to reducing the amount of the particulates passing through the second sliding slot 116.

With respect to FIGS. 3-9, in order to facilitate observation or control of the movement of the first slider 112 from outside the inner shaft holder 131, the inner shaft holder 131 includes a first sliding slot opening 138, and the first sliding slot opening 138 is arranged opposite to the first sliding slot 113 in the first pusher 111. Since the first pusher 111 may be arranged in the inner shaft holder 131, the first pusher 111 may slide relative to the inner shaft holder 131, and the generated particulates may flow out through the first sliding slot opening 138. By covering the cover plate 191 on the first sliding slot opening 138, it is conducive to reducing the amount of the particulates passing through the first sliding slot opening 138.

With respect to FIGS. 3-9, since the second pusher 114 may be arranged in the inner shaft holder 131, the second pusher 114 may slide relative to the inner shaft holder 131, and the generated particulates may flow out through the second sliding slot opening 139. By covering the cover plate 191 on the second sliding slot opening 139, it is conducive to reducing the amount of the particulates passing through the second sliding slot opening 139.

Optionally, the winding device 10 further includes: a magnetic component 194 arranged at the inner shaft holder 131 and configured to attract the particulates in the inner shaft holder 131.

From the foregoing, it can be seen that during the winding, multiple components in the winding device 10 may move relative to each other and may thus generate particulates as a result of mutual friction. If the particulates fall onto the electrode assembly 20, the particulates may puncture the electrode assembly 20, thus reducing the yield of the electrode assembly 20. At least part of the particulates may be magnetically attracted, the magnetic component 194 is arranged at the inner shaft holder 131 such that the magnetic component 194 can attract the particulates around a path in which the particulates may pass, and the possibility of the particulates falling onto the electrode assembly 20 is thus reduced.

Optionally, the magnetic component 194 is arranged in at least one of the following positions: on a side of the first inner shaft 110 facing the first pusher 111; on a side of the first pusher 111 facing the first inner shaft 110; on a side of the second pusher 114 facing the inner shaft holder 131; on a side of the inner shaft holder 131 facing the second pusher 114; in a part of the inner shaft holder 131 close to the first sliding slot 113; in a part of the inner shaft holder 131 close to the second sliding slot 116; on a side of the inner shaft holder 131 close to the first inner shaft 110; and on a side of the first inner shaft 110 close to the inner shaft holder 131.

Figure 15:
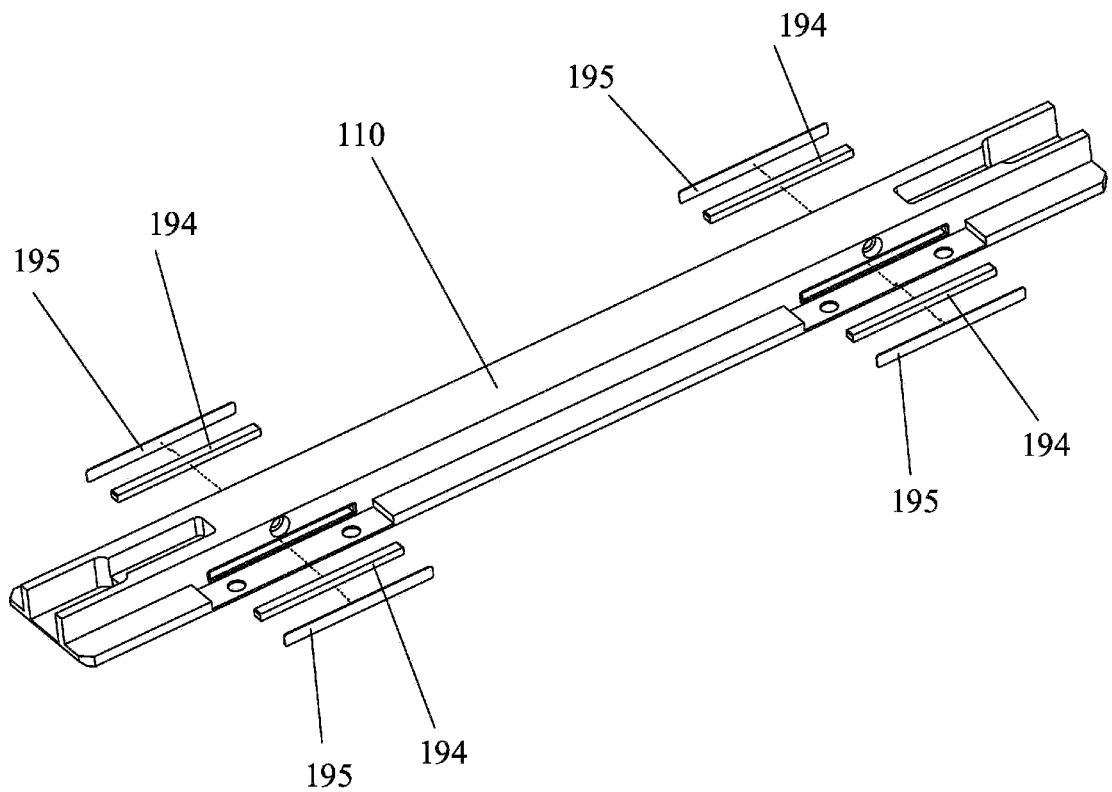
FIG. 15 is a schematic structural diagram of an inner shaft according to an embodiment of the present application.

FIG. 15 is a schematic structural diagram of a first inner shaft 110 according to the present application.

With respect to FIGS. 3-9 and FIG. 15, the particulates in the inner shaft holder 131 may flow out of the inner shaft holder 131 through the gap between first pusher 111 and the first inner shaft 110. By arranging the magnetic component 194 on the side of the first inner shaft 110 facing the first pusher 111 and/or on the side of the first pusher 111 facing the first inner shaft 110, it is conducive to reducing the amount of the particulates flowing out of the inner shaft holder 131 through the gap between the first pusher 111 and the first inner shaft 110.

Figure 16:
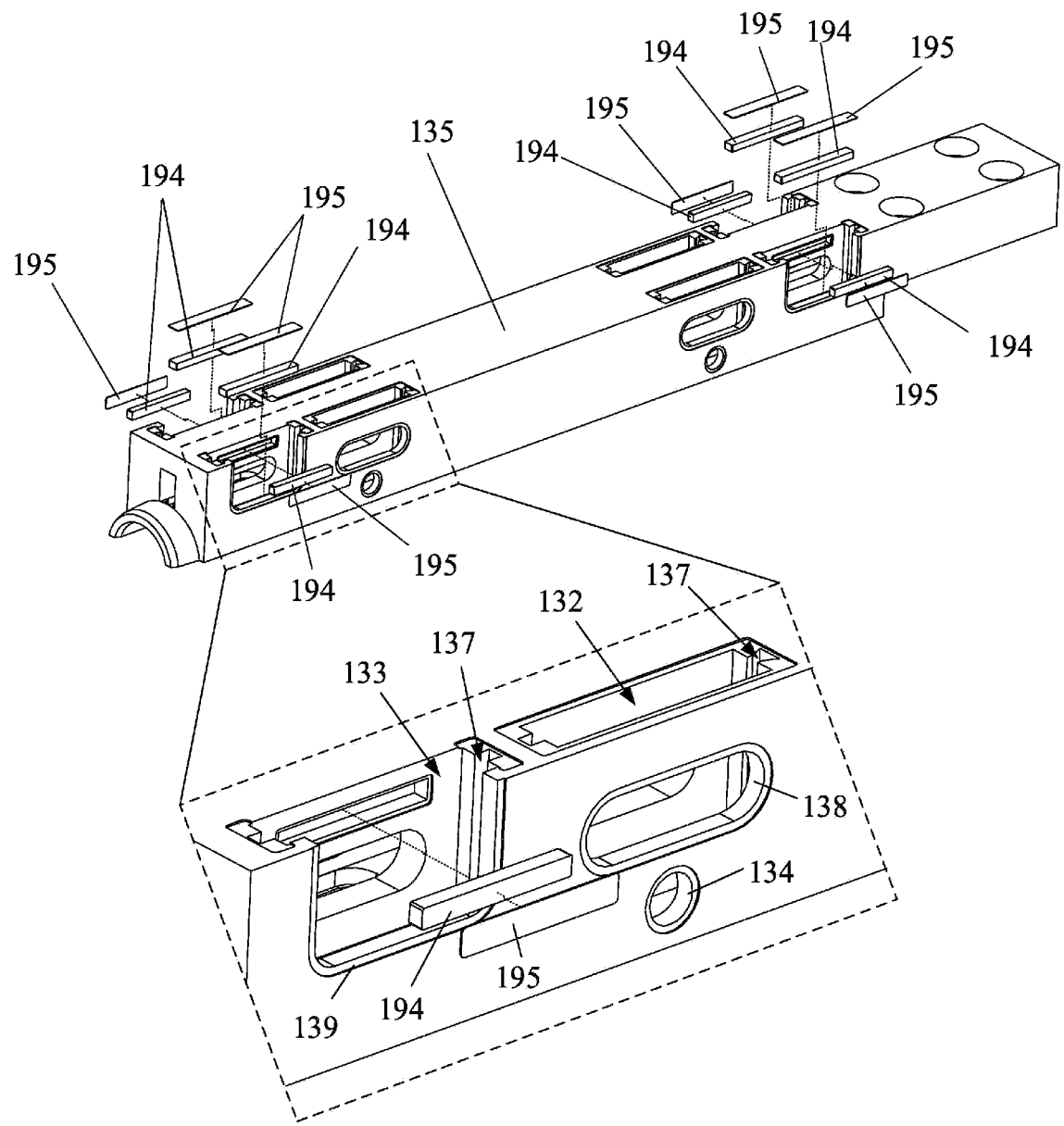
FIG. 16 is a schematic structural diagram of an inner shaft holder according to an embodiment of the present application.
Figure 17:
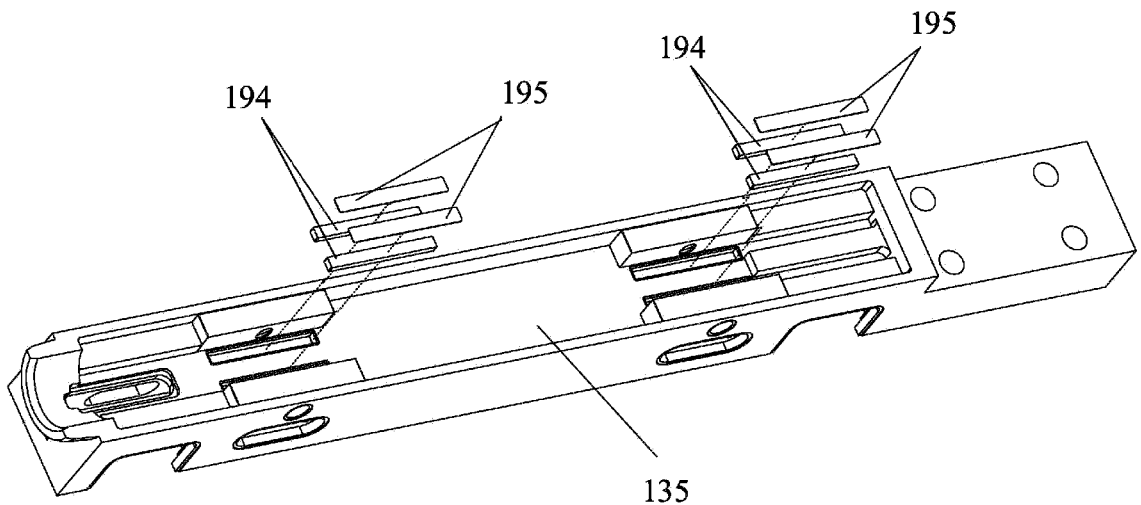
FIG. 17 is a schematic structural diagram of an inner shaft holder according to an embodiment of the present application.

FIGS. 16-17 are schematic structural diagrams of an inner shaft holder 135 according to the present application.

With respect to FIGS. 3-9 and 16, since the second pusher 114 is movable in the second holder cavity 133 of the inner shaft holder 131, the particulates in the inner shaft holder 131 may flow out of the inner shaft holder 131 through the gap between the second pusher 114 and the inner shaft holder 131. The arrangement of the magnetic component 194 on the side of the inner shaft holder 131 facing the second pusher 114 and/or on the side of the second pusher 114 facing the inner shaft holder 131 is conducive to decrease the amount of the particulates flowing out of the inner shaft holder 131 through the gap between the second pusher 114 and the inner shaft holder 131.

With respect to FIGS. 3-9, the particulates in the first pusher 111 may flow out of the first pusher 111 through the first sliding slot 113. The arrangement of the magnetic component 194 on the side of the inner shaft holder 131 close to said first sliding slot 113 is conducive to reducing the amount of the particulates flowing out of the inner shaft holder 131 through the gap between the first pusher 111 and the inner shaft holder 131.

With respect to FIGS. 3-9 and 16, the particulates in the second pusher 114 may flow out of the second pusher 114 through the second sliding slot 116. The arrangement of the magnetic component 194 on the side of the inner shaft holder 131 close to the second sliding slot 116 is conducive to further reducing the amount of the particulates flowing out of the inner shaft holder 131 from the second pusher 114.

With respect to FIGS. 3-9 and 17, since the particulates in the inner shaft holder 131 may flow out of the inner shaft holder 131 through the gap between the inner shaft holder 131 and the first inner shaft 110. The arrangement of the magnetic component 194 on the side of the first inner shaft 110 close to the inner shaft holder 131 and/or the side of the inner shaft holder 131 close to the first inner shaft 110 is conducive to reducing the amount of the particulates flowing out of the inner shaft holder 131 through the gap between the inner shaft holder 131 and the first inner shaft 110.

Optionally, a magnetic cover plate 195 may cover the magnetic component 194. The provision of the magnetic cover plate 195 is conducive to preventing the amount of the particulates falling down from the magnetic component 194 from falling on the electrode assembly 20.

As shown in FIG. 15, the magnetic component 194 may be arranged on the side of the first inner shaft 110 facing the first pusher 111, and the magnetic cover plate 195 may be arranged on the side of the magnetic component 194 away from the first inner shaft 110.

As shown in FIG. 16, the magnetic component 194 may be arranged on the side of the inner shaft holder 131 facing the second pusher 114, and the magnetic cover plate 195 may be arranged on the side of the magnetic component 194 away from the inner shaft holder 131.

As shown in FIG. 16, the magnetic component 194 may be arranged on the side of the inner shaft holder 131 close to the second sliding slot 116, and the magnetic cover plate 195 may be arranged on the side of the magnetic component 194 away from the inner shaft holder 131.

As shown in FIG. 17, the magnetic component 194 may be arranged on the side of the inner shaft holder 131 close to the first inner shaft 110, and the magnetic cover plate 195 may be arranged on the side of the magnetic component 194 away from the inner shaft holder 131.

Figure 18:
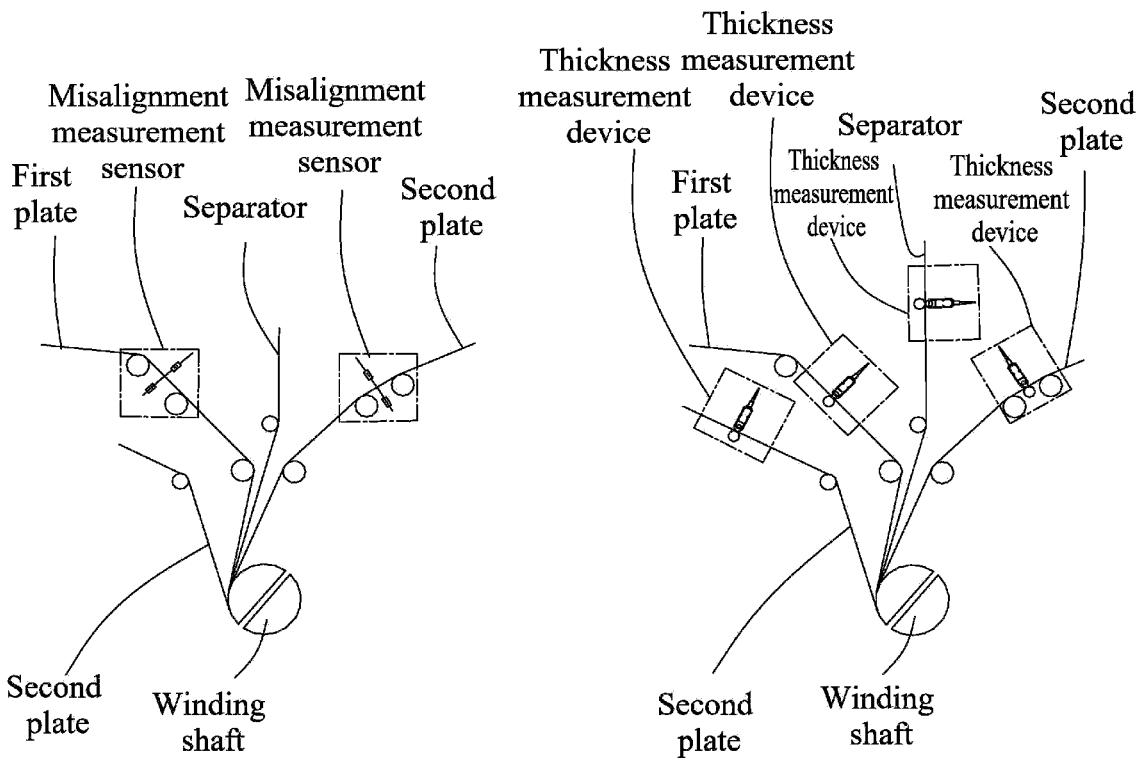
FIG. 18 is a schematic diagram of a method for adjusting a misaligned tab according to an embodiment of the present application.

FIG. 18 illustrates a schematic diagram of a method for adjusting a misaligned tab according to an embodiment of the present application.

The misalignment quantity and misalignment direction of the tab of a multi-tab cell is automatically and on-line measured in real time by measuring a winding angle of a designated tab with a measurement sensor, comparing the same with a standard angle and calculating the misalignment quantity of the tab in real time.

Assuming that the misalignment quantity of an $n^{th}$ tab from inside to outside is represented by $X_n$, a winding angle of the $n^{th}$ tab is represented by $\theta_n$, a standard winding angle of the $n^{th}$ tab is represented by $\theta_n'$, the winding shaft has a perimeter represented by C, and a wound cell layer has a thickness represented by T, the misalignment quantity of the $n^{th}$ tab is calculated as:

$$X_n = \frac{\theta_n - \theta_n'}{360}(2nT\pi + C).$$

An algorithm for a perimeter adjustment quantity ΔL of the winding shaft is that: a tab misalignment quantity of a previous cell is $X=X_n$, the number of turns of a wound cell is represented by N, and a tab misalignment adjustment coefficient is represented by K (0.2<K<1), where ΔL=KX/N.

Thus, it is possible to achieve automatic adjustment of the perimeter of the winding shaft, and avoid the problems of manually sticking and ripping off Teflon to adjust the perimeter of the winding shaft, and the problem of the perimeter of the winding shaft being not adjusted in a timely manner, thereby reducing the yield loss of the misaligned tab of the apparatus and improving the activation of the winding apparatus.

The embodiments of the present application provide a winding device and a winding apparatus, which have a characteristic of separately adjusting the perimeters of an inner shaft and an outer shaft. The winding device and the winding apparatus may be applied in the winding production of an electrode assembly. In addition, the provisions of the cover plate, the magnetic component and the magnetic cover plate are conducive to reducing the possibility of the particulates in the winding device falling onto the electrode assembly, thereby improving the production quality of the electrode assembly.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A winding device, characterized by comprising:
   a first inner shaft and a second inner shaft that are arranged opposite to each other and configured to clamp an electrode assembly; and
   a first outer shaft and a second outer shaft that are arranged opposite to each other, outer peripheries of the first outer shaft and the second outer shaft being configured to wind the electrode assembly; and, wherein
   the winding device further comprises a first slider and a first pusher, wherein the first pusher is fixedly connected to the first inner shaft, the first pusher is provided with a first sliding slot, the first slider is movable in the first sliding slot, the first slider is configured to reciprocate in a first direction, and an extension direction of the first sliding slot is inclined from the first direction such that the first pusher drives the first inner shaft to reciprocate in a second direction so as to clamp or release the electrode assembly, the second direction being perpendicular to the first direction; and
   the winding device further comprising a second slider and a second pusher, wherein the second pusher is fixedly connected to the first outer shaft, the second pusher is provided with a second sliding slot, the second slider is movable in the second sliding slot, the second slider is configured to reciprocate in a third direction, and an extension direction of the second sliding slot is inclined from the third direction such that the second pusher drives the first outer shaft to reciprocate in a fourth direction so as to increase or decrease a distance between the first outer shaft and the second outer shaft, the third direction being parallel to the first direction, and the fourth direction being perpendicular to the third direction.

2. The winding device according to claim 1, characterized in that the winding device further comprises:
   a first adjustment rod that is arranged parallelly relative to the first direction, wherein the first adjustment rod is fixedly connected to the first slider, and the first adjustment rod is configured to reciprocate in the first direction so as to drive the first slider to reciprocate in the first direction; and
   a second adjustment rod that is arranged parallelly relative to the third direction, wherein the second adjustment rod is fixedly connected to the second slider, and the second adjustment rod is configured to reciprocate in the third direction so as to drive the second slider to reciprocate in the third direction.

3. The winding device according to claim 2, characterized in that the second adjustment rod and the second slider are fixedly connected by means of a first connecting shaft, the first adjustment rod comprises a first adjustment rod through hole, and the first connecting shaft runs through the first adjustment rod through hole and is capable of reciprocating in the first adjustment rod through hole in the third direction.

4. The winding device according to claim 3, characterized in that the size of the first adjustment rod through hole in the third direction is greater than or equal to a movement stroke of the second slider in the third direction.

5. The winding device according to claim 2, characterized in that the first adjustment rod and the first slider are fixedly connected by means of a second connecting shaft, the second adjustment rod comprises a second adjustment rod through hole, and the second connecting shaft runs through the second adjustment rod through hole and is capable of reciprocating in the second adjustment rod through hole in the first direction.

6. The winding device according to claim 5, characterized in that the size of the second adjustment rod through hole in the first direction is greater than or equal to a movement stroke of the first slider in the first direction.

7. The winding device according to claim 2, characterized in that one end of the second adjustment rod is provided with an adjustment rod protrusion, and the adjustment rod protrusion protrudes toward the first adjustment rod in a direction perpendicular to the first direction.

8. The winding device according to claim 2, characterized in that the winding device further comprises:
   an inner shaft holder configured to house the first inner shaft, the first slider, the first pusher, the second slider and the second pusher,
   wherein the inner shaft holder has a first holder cavity and a second holder cavity, the first holder cavity is configured to house the first pusher, an opening of the second holder cavity faces the first outer shaft, and the second holder cavity is configured to accommodate the second pusher.

9. The winding device according to claim 8, characterized in that the winding device further comprises:

a first driving rod configured to apply a driving force in the first direction to the first adjustment rod; and a second driving rod configured to apply a driving force in the third direction to the second adjustment rod;

wherein the first driving rod and the second driving rod are located at two sides of the inner shaft holder.

10. The winding device according to claim 9, characterized in that the winding device further comprises:

a first elastic element configured to apply a driving force in a direction opposite to the first direction, to the first adjustment rod; and a second elastic element configured to apply a driving force in a direction opposite to the third direction, to the second adjustment rod.

11. The winding device according to claim 9, characterized in that the winding device further comprises:

a winding shaft seat, wherein the winding shaft seat has a winding shaft seat cavity with an opening facing the inner shaft holder, the first adjustment rod extends into the winding shaft seat cavity, and the first elastic element abuts against a bottom wall of the winding shaft seat cavity.

12. The winding device according to claim 11, characterized in that the bottom wall of the winding shaft seat cavity is provided with a winding shaft seat through hole, and the first driving rod runs through the winding shaft seat through hole and extends into the winding shaft seat cavity; and the winding device further comprises a drive slider housed inside the winding shaft seat cavity, the drive slider is fixedly connected to the first adjustment rod and is fixed relative to the first driving rod in the first direction, and the first elastic element abuts between the drive slider and the winding shaft seat.

13. The winding device according to claim 11, characterized in that the winding device further comprises a connecting seat located between the winding shaft seat and the inner shaft holder and covering the opening of the winding shaft seat cavity, the connecting seat comprises a connecting seat through hole, and the first adjustment rod runs through the connecting seat through hole.

14. The winding device according to claim 10, characterized in that one end of the second elastic element is fixed to the inner shaft holder, and the other end of the second elastic element abuts against the second adjustment rod.

15. The winding device according to claim 8, characterized in that the winding device further comprises:

a support portion housed in the inner shaft holder, the support portion being provided with movement grooves for the first adjustment rod and the second adjustment rod.

16. The winding device according to claim 15, characterized in that the support portion comprises a support portion opening, and the winding device further comprises a third pusher, wherein the third pusher runs through the support portion opening and is fixedly connected to the second adjustment rod, the third pusher is used to apply a driving force in the third direction to the second adjustment rod, and an inner diameter of the support portion opening in the third direction is greater than or equal to the stroke of the second adjustment rod in the third direction.

17. The winding device according to claim 8, characterized in that the inner shaft holder further comprises a third sliding slot in communication with the first holder cavity, wherein a body of the first pusher is housed inside the first holder cavity; the first pusher further comprises a first pusher protrusion, wherein the first pusher protrusion is slidable in the third sliding slot in the second direction, and a sliding clearance between the first pusher protrusion and the third sliding slot is smaller than a sliding clearance between the body of the first pusher and the first holder cavity.

18. The winding device according to claim 17, characterized in that the winding device further comprises a cover plate covering the end of the first holder cavity and/or the third sliding slot close to the first outer shaft.

19. The winding device according to claim 8, characterized in that the inner shaft holder further comprises a fourth sliding slot in communication with the second holder cavity, wherein a body of the second pusher is housed inside the second holder cavity; the second pusher further comprises a second pusher protrusion, wherein the second pusher protrusion is slidable in the fourth sliding slot in the fourth direction, and a sliding clearance between the second pusher protrusion and the fourth sliding slot is smaller than a sliding clearance between the body of the second pusher and the second holder cavity.

20. The winding device according to claim 19, characterized in that the winding device further comprises a cover plate covering the end of the fourth sliding slot close to the first outer shaft.

* * * * *